United States Patent [19]

Mano

[11] Patent Number: 5,699,504
[45] Date of Patent: Dec. 16, 1997

[54] MULTIPROCESSOR SYSTEM FORMED OF A PLURALITY OF DUPLEX PROCESSORS

[75] Inventor: Kosei Mano, Kawasaki, Japan

[73] Assignee: Fujitsu Limited, Kanagawa, Japan

[21] Appl. No.: 540,446

[22] Filed: Oct. 6, 1995

[30] Foreign Application Priority Data

Oct. 7, 1994 [JP] Japan .................................. 6-243733

[51] Int. Cl.⁶ .................................................. G06F 11/34
[52] U.S. Cl. ................................. 395/182.11; 371/8.2
[58] Field of Search ........................ 395/180, 182.08, 395/182.09, 182.11, 200.1, 200.05, 600; 371/8.1, 8.2, 7, 68.1, 68.2; 364/975.1

[56] References Cited

U.S. PATENT DOCUMENTS

| | | | |
|---|---|---|---|
| 5,155,847 | 10/1992 | Kinovac et al. | 395/600 |
| 5,434,998 | 7/1995 | Akai et al. | 395/182.11 |
| 5,530,949 | 6/1996 | Koda et al. | 395/182.08 |

FOREIGN PATENT DOCUMENTS

| | | | |
|---|---|---|---|
| 4291538 | 10/1992 | Japan | H04L 12/00 |
| 056149 | 3/1993 | Japan . | |
| 7177543 | 7/1995 | Japan . | |

Primary Examiner—Robert W. Beausoliel, Jr.
Assistant Examiner—Albert Decady
Attorney, Agent, or Firm—Helfgott & Karas, P.C.

[57] ABSTRACT

A multiprocessor system includes duplex processors, each duplex processor having two processors, one being active and the other being a stand-by processor. Each processor includes a central processing unit (CPU) and main storage, the CPU being able to access the main storage in the other processor of the duplex processor. Each duplex processor is interconnected through communication buses to enable communication between any processors, and a particular processor can read a program file from program file storage and send it to each processor. For updating from an old program file to a new program file, each duplex processor is able to access each communication bus to identify an usable communication bus for each target processor, to set any communication bus to an active communication path for each target processor, and to transmit/receive data on the active communication path while setting another communication bus as a stand-by communication path. During operation of the active CPU using the old program file, the new program file is read to the main storage of the stand-by CPU, and the new program file of the stand-by CPU is started from the active CPU. Operation of the new program file in communicating between stand-by CPUs is confirmed by CPUs by using the stand-by communication path set by the active CPU, and setting all stand-by CPUs to the active CPU so that the program file is updated.

24 Claims, 25 Drawing Sheets

Fig.5A

| PA | SD | FC | DA | SA | DPA | SPA | DATA | FCS | ED | FS |
|----|----|----|----|----|-----|-----|------|-----|----|----|

Fig.5B

| DISPLAY OF INSTRUCTION OF SWITCH TO ACTIVE BUS |
|---|
| FACTOR OF SWITCH TO ACTIVE BUS |
| RING BUS NUMBER TO NEXT ACTIVE BUS |

Fig.5C

| DISPLAY OF CONFIRMATION OF SWITCH TO ACTIVE BUS |
|---|
| RESULT OF SWITCH TO ACTIVE BUS |

Fig.16A

| | |
|---|---|
| IDENTIFIER OF TRANSFER ORDER FOR NEW PROGRAM FILE DATA | 4 BYTES |
| F   TRANSFER DATA SERIAL NUMBER | 4 BYTES |
| TRANSFER PROGRAM FILE NUMBER | 4 BYTES |
| MAIN STORAGE ADDRESS FOR TRANSFER DATA WRITE | 4 BYTES |
| BYTE NUMBER OF TRANSFER DATA | 4 BYTES |
| TRANSFER DATA | MAXIMUM 4096 BYTES |

Fig.16B

| | |
|---|---|
| IDENTIFIER OF RESULT OF RECEPTION OF ORDER FOR NEW PROGRAM FILE DATA | 4 BYTES |
| TRANSFER DATA SERIAL NUMBER | 4 BYTES |
| RESULT OF RECEPTION | 4 BYTES |

MULTIPROCESSOR SYSTEM FORMED OF A PLURALITY OF DUPLEX PROCESSORS

BACKGROUND OF THE INVENTION

1. Field of the Invention

The present invention relates to a processor system formed of a plurality of duplex processors connected by a plurality of communication paths. Particularly, it relates to a method for updating a program file from an old program file to a new program file in a multiprocessor system, and a multiprocessor system enabling update of the program file without stopping service currently executed by the system.

2. Description of the Related Art

Recently, multiprocessor systems have become widely utilized in, for example, an electronic exchange. In general, such a multiprocessor system is formed by a plurality of duplex processors in order to maintain communications. That is, one is used as an active processor and the other is used as a stand-by processor. When failure occurs in the active processor, processing is switched to the stand-by processor. Further, each processor in a duplex processor includes at least one central processing unit (CPU) and a main storage, and further includes a read unit, a transmission unit, etc. The CPU can access the main storage which belongs to the other CPU in the duplex processor. Further, the system includes communication paths for interconnecting the duplex processor.

In above multiprocessor system, in an update operation of a program file, when loading a new program file to a stand-by CPU in the stand-by processor, it is desirable to confirm operation of a new program file without stopping the service currently executed by an old program file in an active CPU in the active processor.

In general, as a method for updating a program file in a multiprocessor system, after the new program file is loaded to the stand-by CPU, the stand-by CPU is switched to the active CPU, and the active CPU confirms operation of the new program file.

However, in above mentioned conventional method, in order to operate the new program file loaded in the stand-by CPU, it is necessary to stop the service currently executed by the old program file.

SUMMARY OF THE INVENTION

The object of the present invention is to provide a method for updating a program file from an old program file to a new program file in a multiprocessor system, and the multiprocessor system formed of a plurality of duplex processors which can update the program file without stopping the service currently executed in the system, particularly, it can confirm the operation of the new program file without stopping the service currently executed by the old program file. Accordingly, it is possible to provide an update method of the program file having very little influence on the throughput of the system.

In accordance with a first aspect of the present invention, there is provided a method for updating a program file from an old program file to a new program file in a multiprocessor system formed by a plurality of duplex processors, each duplex processor having two processor, one being used as an active processor, and the other being used as a stand-by processor, each processor having at least a central processing unit (CPU) and a main storage, the CPU being able to access the main storage in the other processor of the duplex processor; and each duplex processor being interconnected through communication buses so that it is possible to communicate with any other processor, and a particular processor in the duplex processor reading a program file from a program file storage and sending it to each processor; the method including:

in each duplex processor, it being able to access each of communication buses therefrom, being able to identify a usable communication bus for each target processor, setting any communication bus to an active communication path for each target processor, and transmitting/receiving data on the active communication path by setting another communication bus to a stand-by communication path;

during the operation of the active CPU, using the old program file, reading a new program file to the main storage of the stand-by CPU;

starting the new program file in the stand-by CPU from the active CPU;

communicating between stand-by CPUs by using the stand-by communication path which is set by the active CPU in order to confirm operation of the new program file in the stand-by CPU; and setting all stand-by CPUs to be active CPUs so that the program file is updated from the old program file to the new program file.

In accordance with a second aspect of the present invention, there is provided a method for updating a program file from an old program file to a new program file, the method including:

providing a managing unit for determining whether a communication path is usable or not between processors, and setting any one of the usable communication paths to an active communication path; a switching unit for switching between the active communication path and the stand-by communication path, thereby setting any communication bus to the active communication path for each target processor, and transmitting/receiving data on the active communication path by using another communication bus to the stand-by communication path; a reception unit for writing the new program file to the main storage of each stand-by CPU; start unit for starting the new program file which is written into the main storage of the stand-by CPU; and an active unit for setting the new program file, which is started by the stand-by CPU, to the active new program file;

during operation of the active CPU using the old program file;

starting the new program file, which is read in the main storage of the stand-by CPU, from the active CPU;

communicating between stand-by CPUs by using the stand-by communication path which is set by the active CPU in order to confirm operation of the new program file in the stand-by CPU; and setting all stand-by CPUs to be active CPUs so that the program file is updated from the old program file to the new program file.

In accordance with a third aspect of the present invention, there is provided a multiprocessor system formed by a plurality of duplex processors, each duplex processor having two processor, one being used as an active processor, and the other being used as a stand-by processor, each processor having at least a central processing unit (CPU) and a main storage, the CPU being able to access the main storage in the other processor of the duplex processor; and each duplex processor being interconnected through communication buses so that it is possible to communicate with any processor, and a particular processor in the duplex processor reading a program file from a program file storage and sending it to each processor; the system including:

- a unit provided in each duplex processor, for accessing each of communication buses therefrom, able to identify a usable communication bus for each target processor and set any communication bus to an active communication path for each target processor, and transmitting/receiving data on the active communication path by setting another communication bus to a stand-by communication path;
- a unit for, during operation of the active CPU using the old program file, reading the new program file to the main storage of the stand-by CPU;
- a unit for starting the new program file of the stand-by CPU from the active CPU;
- a unit for communicating between stand-by CPUs by using the stand-by communication path which is set by the active CPU in order to confirm operation of the new program file in the stand-by CPU; and
- a unit for setting all stand-by CPUs to be active CPUs so that the program file is updated from the old program file to the new program file.

In accordance with a fourth aspect of the present invention, there is provided a multiprocessor system including:

- a managing unit for determining whether a communication path is usable or not between processors, and setting any one of usable communication paths to an active communication path;
- a switching unit for switching between the active communication path and the stand-by communication path, thereby setting any communication bus to the active communication path for each target processor, and transmitting/receiving data on the active communication path by using another communication bus to the stand-by communication path;
- a reception unit for writing the new program file to the main storage of each stand-by CPU;
- a start unit for starting the new program file which is written into the main storage of the stand-by CPU;
- an active unit for setting the new program file, which is started by the stand-by CPU, to the active new program file;
- a unit for starting the new program file, which is read in the main storage of the stand-by CPU, from the active CPU, during run of the active CPU using the old program file;
- a unit for communicating between stand-by CPUs by using the stand-by communication path which is set by the active CPU in order to confirm operation of the new program file in the stand-by CPU; and
- a unit for setting all stand-by CPUs to be active CPUs so that the program file is updated from the old program file to the new program file.

BRIEF DESCRIPTION OF THE DRAWINGS

In the drawings:

FIG. 5A shows a format of communication data;

FIG. 5B shows an instruction order for switching the active communication path;

FIG. 5C shows a confirmation order for switching the active communication path;

FIG. 16A is a view for explaining a format of a data transfer order for the new program file;

FIG. 16B is a view for explaining a format of a received result order for the new program file;

DESCRIPTION OF THE PREFERRED EMBODIMENTS

Figure 1:
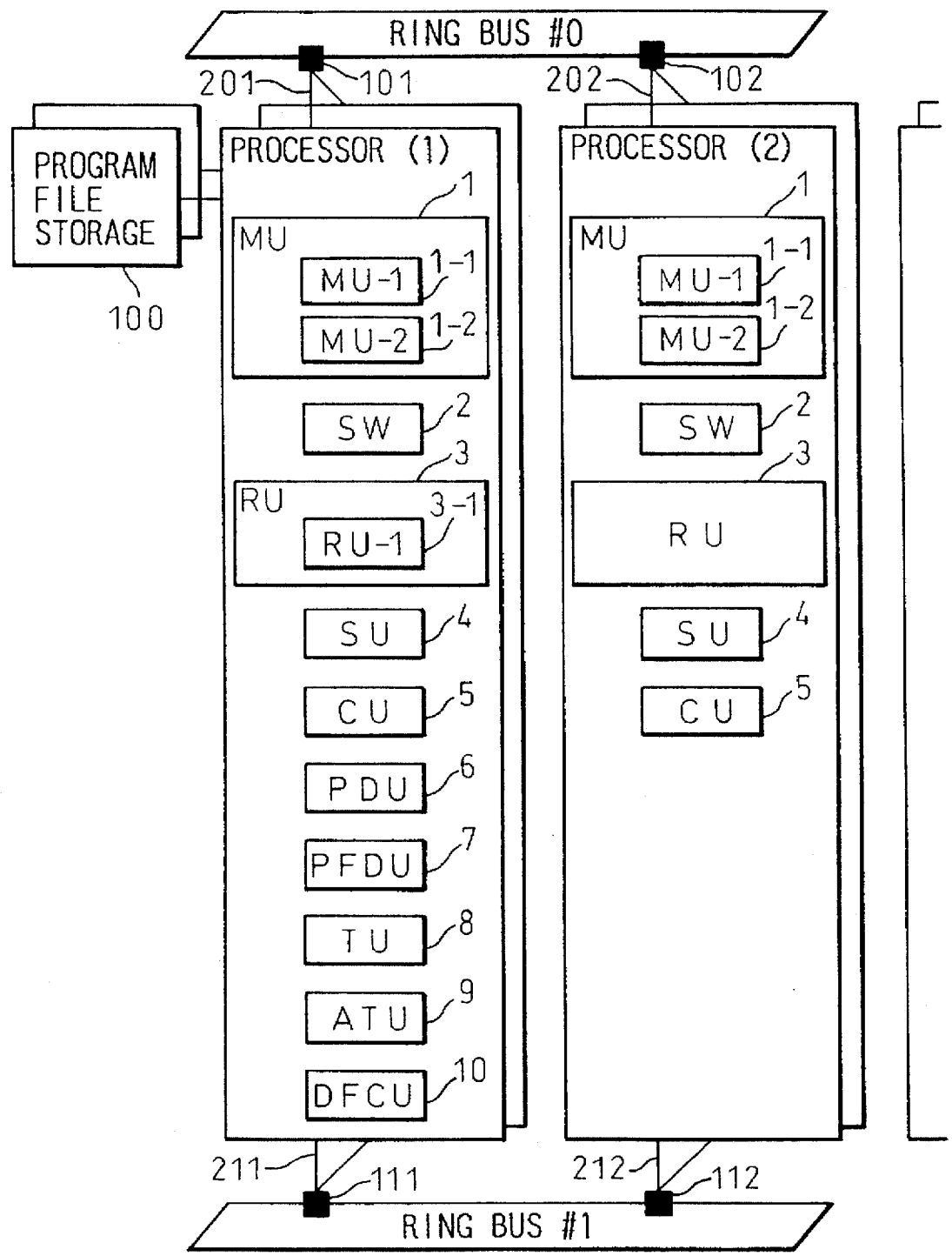
FIG. 1 is a basic structure of a multiprocessor system according to the present invention.

FIG. 1 is a basic structure of a multiprocessor system according to the present invention. In the drawing, a duplex processor is formed of a set of processors (1) and (2) in which one is used as an active processor and the other is used as a stand-by processor. Reference numbers 101, 102, 111 and 112 denote ring bus adapters, and 201, 202, 211 and 212 denote access routes. The processor (1) is connected to the ring bus #0 through the access route 201 and the ring bus adapter 101, and the processor (2) is connected to the ring bus #0 through the access route 202 and the ring bus adapter 102.

Further, the processor (1) is connected to the ring bus #1 through the access route 211 and the ring bus adapter 111, and the processor (2) is connected to the ring bus #1 through the access route 212 and the ring bus adapter 112. The processor (1) is a particular processor and is connected to a program file storage 100.

As shown in the drawing, the processor (1) includes: a managing unit (MU) 1 for managing a communication route between processors; a switch unit (SU) 2 for switching the stand-by communication bus to the active communication bus; a reception unit (RU) 3 for receiving the new program file; a start unit (SU) 4 for starting the new program file in the stand-by CPU; an active unit (CU) 5 for setting the program file to the new program file; a processor designating unit (PDU) 6 for designating a target processor to which the program file should be transferred; a program file designating unit (PFDU) 7 for designating the program file to be transferred; a transfer unit (TU) 8 for transferring the new program file; an automatic transfer unit (ATU) 9 for transferring input commands; and a data following/converting unit 10 for taking over the program file of the stand-by CPU by the active CPU.

On the other hand, the processor (2) includes the same components as those of the processor (1) except for units 6 to 10. That is, the processor (2) includes the managing unit (MU) 1 for managing communication lines among processors; the switch unit (SU) 2 for switching the stand-by path to the active communication path; the reception unit (RU) 3 for receiving the new program file; the start unit (SU) 4 for starting the new program file for the stand-by CPU; and the active unit (CU) 5 for setting the old program file to the new program file.

In the present invention, the following components are provided in order to resolve problems mentioned above.

(1) Each processor includes a managing unit 1 for managing the communication path between its own processor and a target processor in order to set any communication path as the active communication path.

(2) Each processor includes a switch unit 2 for switching the stand-by communication bus to the active communication bus.

(3) Each processor includes a reception unit 3 for receiving the new program file in order to write a program file, which is received from a particular processor, into a designated address in the main storage of the stand-by CPU.

(4) The particular processor includes a start unit 4 for starting the new program of the stand-by processor belonging to the particular processor, and for starting the new program of the stand-by processor belonging to each processor in accordance with instructions by a service man.

(5) The particular processor includes an active unit 5 for setting the new program of the stand-by processor of the particular processor to the active program, and for setting the new program of the stand-by processor of each processor in accordance with instructions by the service man.

(6) The particular processor includes a processor designating unit 6 for designating a target processor which the program file is transferred in order to designate the processor which switches the program file in accordance with the service man.

(7) The particular processor includes the program file designating unit 7 for designating a particular portion of the program file to be transferred, and for switching an old portion corresponding to the particular portion to the particular portion in accordance with instructions by the service man.

(8) The particular processor includes the transfer unit 8 for transferring the new program file in order to input the new program file for each processor to be transferred.

(9) The particular processor includes the automatic transfer unit 9 for automatically transferring a particular command, which is input to the old program file side, to the new program file side during operation of the active CPU which is operated by the old program file.

(10) The particular processor includes a data following/converting unit 10 for transferring the data, which are designated by the old program side, to the new program file side during operation of the CPU which is operated by the old program file, and for converting data in the new program file side in order to follow (or, take over) the converted data to the main storage or an external storage in the new program file side.

Figure 2:
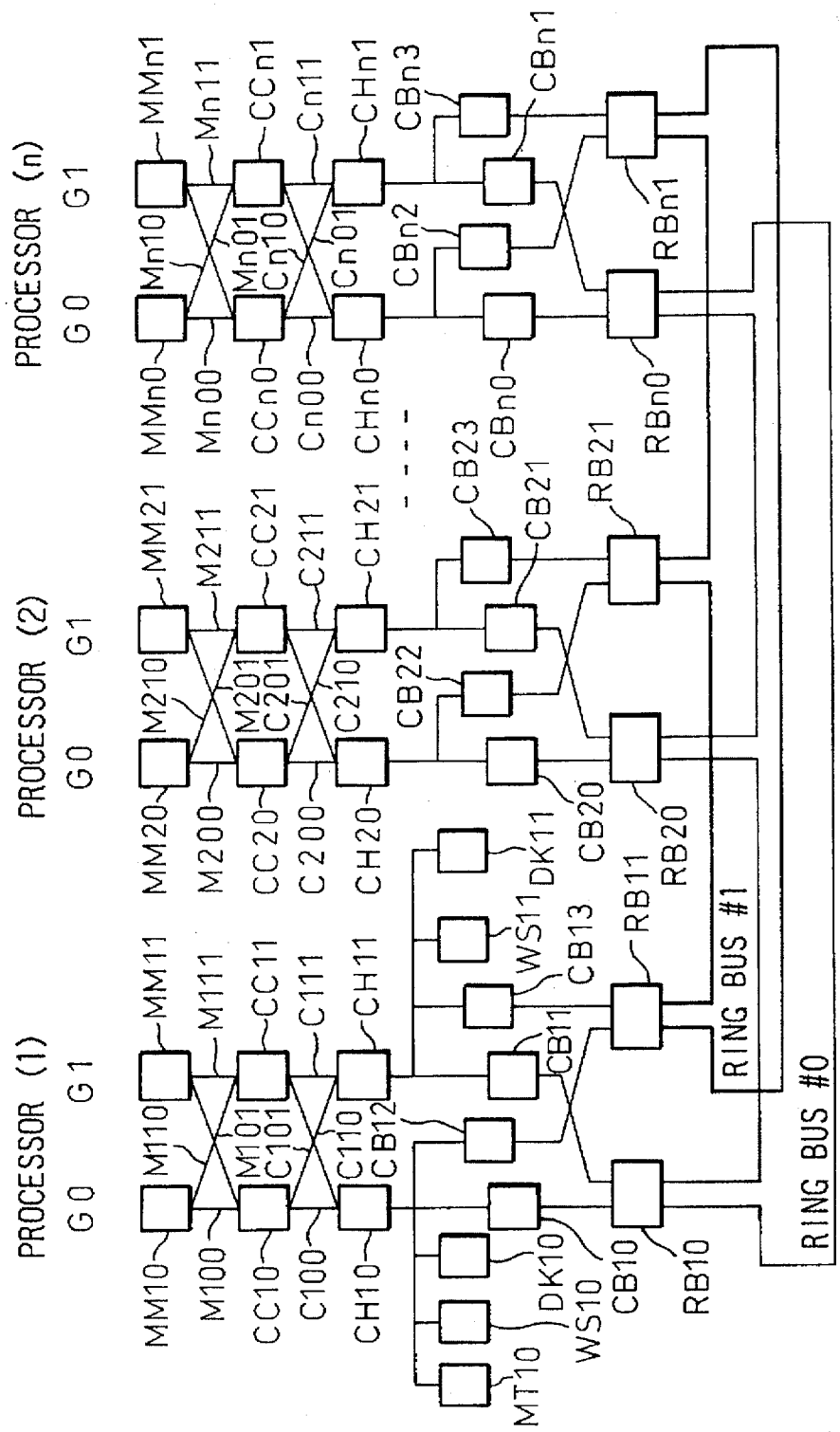
FIG. 2 is a block diagram of a multiprocessor system according to an embodiment of the present invention.

FIG. 2 is a block diagram of a multiprocessor system according to an embodiment of the present invention. As shown in the drawing, the multiprocessor system includes a plurality of processors (1), (2), . . . , (n), and each processor includes two processors G0 and G1. For example, the processor G0 is used as the active processor and the processor G1 is used as the stand-by processor.

Further, reference numbers CC10 to CCn1 represent central processing units (CPUs); MM10 to MMn1 represent main storages; and CH10 to CHn1 represent channel control units. In the drawing, a suffix (0) denotes the processor G0 and the suffix (1) denotes the processor RB10 to RBn1 represent ring bus adapters. The ring bus adapters RB10, RB20, . . . , RBn0 which belong to the processor G0 are connected to a ring bus #0, and the ring bus adapters RB11, RB21, . . . , RBn1 which belong to the processor G1 are connected to a ring bus #1.

Further, (CB10, CB12) to (CBn0, CBn2) represent channel interface apparatuses for the processor G0, and (CB11, CB13) to (CBn1, CBn3) represent channel interface apparatuses for the processor G1. Further, C100 to Cn00 represent channel connection buses for the processor G0, and C111 to Cn11 represent channel connection buses for the processor G1. Further, M100 to Mn00 represent main storage connection buses for the processor G0, and M111 to Mn11 represent main storage connection buses for the processor G1.

Still further, the processor (1) consisting of the processor G0 and the processor G1 is defined as a particular processor, and includes magnetic disk apparatuses DK10 and DK11, work stations WS10 and WS11, and a magnetic tape apparatus MT10.

The operation of the multiprocessor system will be explained in detail below with reference to the drawings. Each component has the following functions.

(1) Managing Means for Communication Paths between Processors

Each processor determines as to which communication path should be used as the active bus, and which communication bus should be used as the stand-by bus, in accordance with the following methods.

(i) Each processor includes a communication bus access means (MU-1) 1-1 (see FIG. 1). When setting the processor to an initial state, each processor determines whether the communication path can be used or not between processors in accordance with an access route of each communication bus and the state of the ring bus adapter.

(ii) Each processor includes a communication path selecting means (MU-2) 1-2 (see FIG. 1), and determines as to which communication path should be used as the active path within the usable communication paths in accordance with a result of response of an instruction order and a confirmation order which are sent/received to/from the target processor.

Figure 3A:
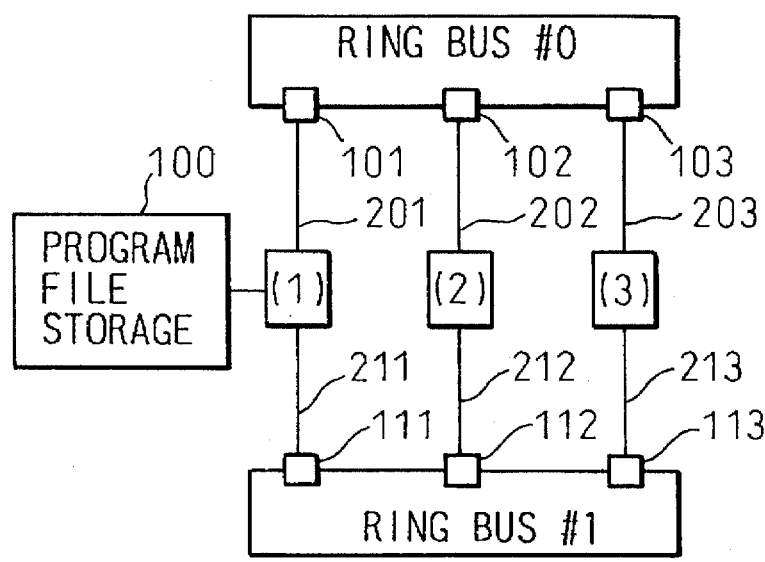
FIG. 3A shows the connection configuration of communication paths among processors.
Figure 3B:
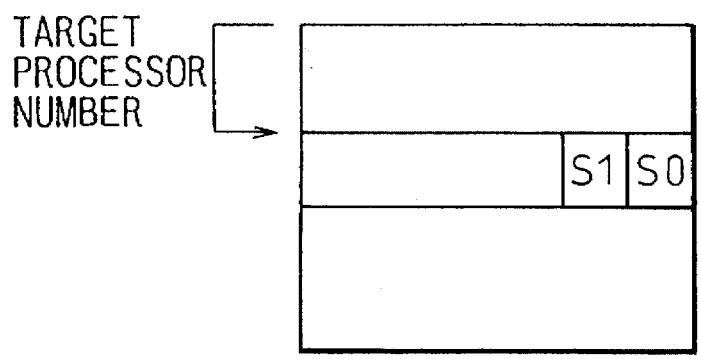
FIG. 3B is a view for explaining preparation of a table.
Figure 3C:
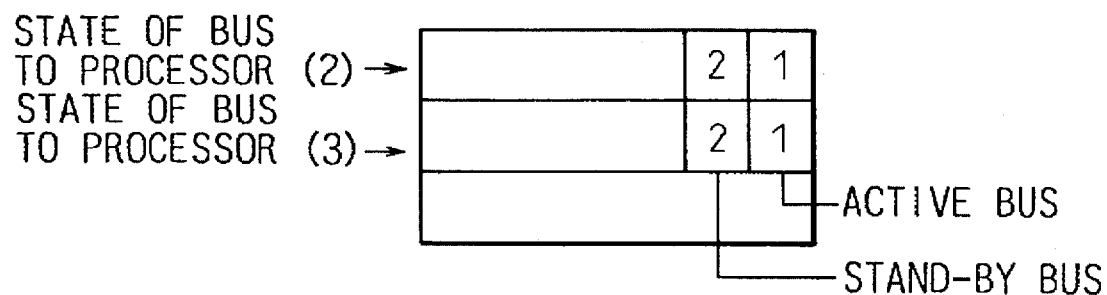
FIG. 3C is a view for explaining the contents of the table shown in FIG. 3B.

FIG. 3A shows connection configuration of communication paths among processors, FIG. 3B is a view for explaining the preparation of a table, and FIG. 3C is a view for explaining the contents of the table shown in FIG. 3B.

In FIG. 3A, the processors (1) to (3) include in common the ring buses #0 and #1, and the processor (1) is selected as the particular processor which includes a program file storage unit 100. In the drawing, 101 to 103 denote ring adapters, and each of processors (1) to (3) is connected to the ring bus #0 through the corresponding ring bus adapter 101 to 103. 201 to 203 denote access routes between the processor and the ring bus #0. Further, 111 to 113 denote ring adapters, and each of processors (1) to (3) is connected to the ring bus #1 through the corresponding ring bus adapter 111 to 113. 211 to 213 denote access routes between the processor and the ring bus #1. In this case, the ring bus #0 is used as the current communication path between processors, and the ring bus #1 is used as the stand-by communication path between processors.

In FIG. 3B, the table is provided in each processor for recording the state of the communication path between processors. Three states, i.e., an active state (1) (a bus is used currently), a stand-by state (2) (a bus is waiting for) and an unusable state (3) (a bus cannot be used) of each of ring buses #0 and #1, are written into areas S1 and S0 by using a target processor number to be transferred as an index.

In FIG. 3C, "1" denotes the active communication path, and "2" denotes the stand-by communication path. That is, as the communication path from the processor (1) to the processors (2) and (3), the ring bus #0 is "1" as the active bus, and the ring bus #1 is "2" as the stand-by bus.

Figure 4:
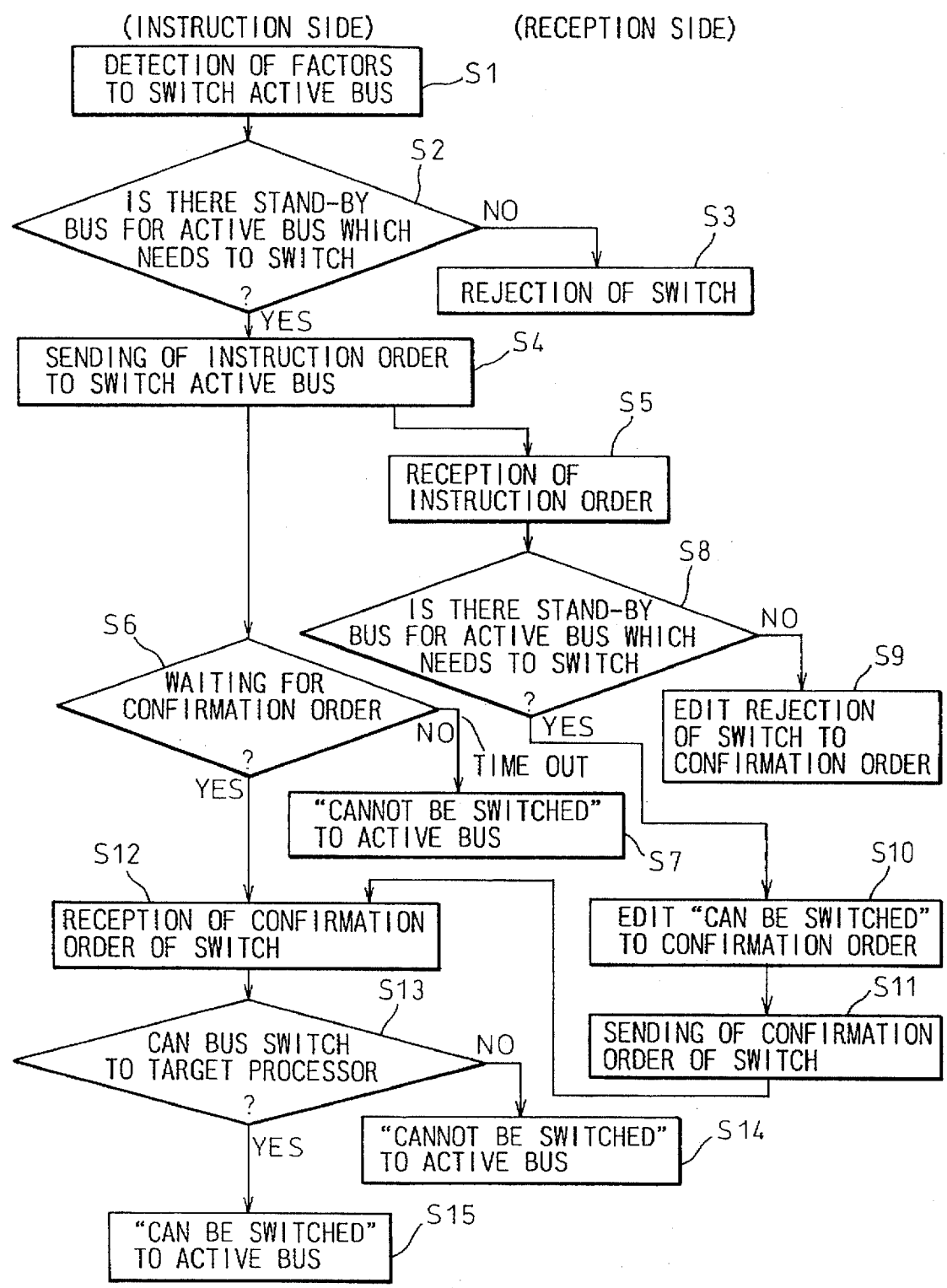
FIG. 4 is a flowchart for explaining a determination process of an active communication path.

FIG. 4 is a flowchart for explaining the determination process of the active communication path. In this flowchart, the left side of the flowchart (steps S1 to S4, S6, S7, and S12 to S15) represents processes in the instruction side for instructing switch of the active communication path, and the right side of the flowchart (steps S5 and S8 to S11) represents processes in the reception side for receiving switching of the active communication path.

FIG. 5A shows a format of communication data, FIG. 5B shows an instruction order for switching the active communication path, and FIG. 5C shows a confirmation order for switching the active communication path.

In FIG. 5A, PA denotes a preamble signal for synchronization of the data transfer, SD denotes a delimiter signal for indicating a start position of a data format, FC denotes a frame control signal for indicating a kind of frame, DA denotes a ring bus adapter number for a destination, SA denotes a ring bus adapter number for a transmission source, DPA denotes a processor number for the destination, SPA denotes a processor number for the transmission source, FCS denotes a frame check sequence used to check whether the frame data is correct, ED denotes an end delimiter signal for indicating an end position of the data frame, and FS denotes a frame state signal for indicating a result of transmission of the frame. Further, DATA includes an instruction order and a confirmation order for switching the active communication path.

In FIG. 5B, the instruction order includes a display of an instruction for switching the active communication path, a factor for switching the active communication path, and a ring bus number used as the next active path.

In FIG. 5C, the confirmation order includes a display of a confirmation for switching the active communication path, and a result for switching the active communication path.

(2) Switching Means for Communication Path

Each processor executes switching of the active communication path to another processor in accordance with the following steps (see FIG. 4).

(i) The processor, which needs to switch the active communication path, sends the instruction order shown in FIG. 5B to the target processor which needs to switch the active communication path.

(ii) The processor which receives the instruction order refers to the managing table shown in FIG. 3, and checks whether the stand-by communication path to the target processor, which sent the instruction order, can be used or not. The target processor returns a response indicating "yes/no" to the transmitting processor in accordance with the confirmation order.

(3) Reception Means for New Program File

The new program file reception means 3 of the particular processor reads the new program file of each processor from the program file storage 100 by using the new program file read means (RU-1) 3-1, and transfers the new program file to the active CPU of each processor by using the new program file transfer means 8.

The new program file reception means 3 of each active CPU writes the new program file, which is received from the new program file transfer means 8, to the main storage of the stand-by CPU by using the main storage access means for accessing another group (for example, processor G1). The particular processor writes the data received from the new program file read means 3-1 to the main storage of the stand-by CPU of the particular processor.

The main storage access means for accessing another group connects/disconnects the memory access path between the active CPU and the stand-by storage in order to read/write data between the active CPU and the stand-by storage.

Figure 6:
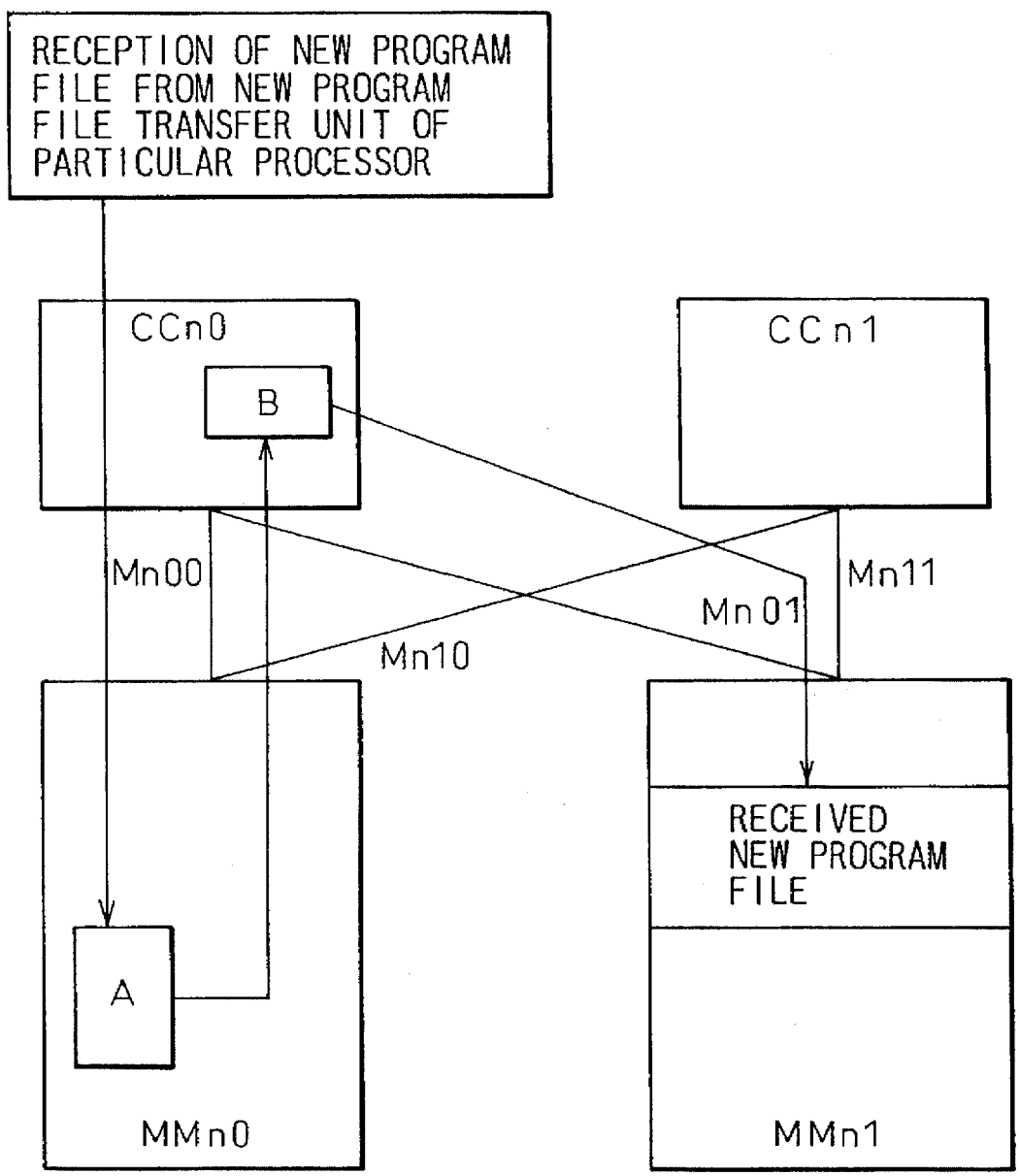
FIG. 6 is a view for explaining procedures of a reception means for the new program file.

FIG. 6 is a view for explaining procedures of the reception means for the new program file. "A" denotes a new program file reception means, and "B" denotes a main storage access means for accessing another group (below, another main storage access means). Further, CCn0 denotes the CPU belonging to the group G0 (CPU-G0), and CCn1 denotes the CPU belonging to the group G1 (CPU-G1). MMn0 denotes the main storage-G0, and MMn1 denotes the main storage-G1. Mn00 denotes the main storage connection bus between the CCn0 and the MMn0, Mn01 denotes the main storage connection bus between the CCn0 and the MMn1, Mn10 denotes the main storage connection bus between the CCn1 and the MMn0, and Mn11 denotes the main storage connection bus between the CCn1 and the MMn1.

Since the particular processor receives the data from the new program file read means (RU-1) 3-1, when the new program file reception means A of the main storage MMn0-G0 receives the new program file from the new program file transfer means 8 of the particular processor, another main storage access means B of the CCn0 of the CPU-G0 stores the received new program file to the main storage MMn1-G1.

(4) New Program File Start Means for Stand-by CPU

The active CPU of the particular processor sets a start address for starting an initial process of the new program file to a program counter of the stand-by CPU by using a start means for starting the CPU of another group (below, another CPU start means) in the duplex processor, and starts the stand-by CPU.

The active processor writes an address of the memory to be started into the program counter of the stand-by processor and performs a start instruction, and the another CPU start means starts the CPU which belongs to another group.

The active CPU of the particular processor starts the stand-by CPU, and sends the start instruction of the new program file to the active CPU of each processor. The active CPU of each processor, which received the start instruction of the new program file, sets the start address for starting the initial process, of the new program file to the program counter of the stand-by CPU by using another CPU start means in duplex processor, and starts the stand-by CPU.

Figure 7:
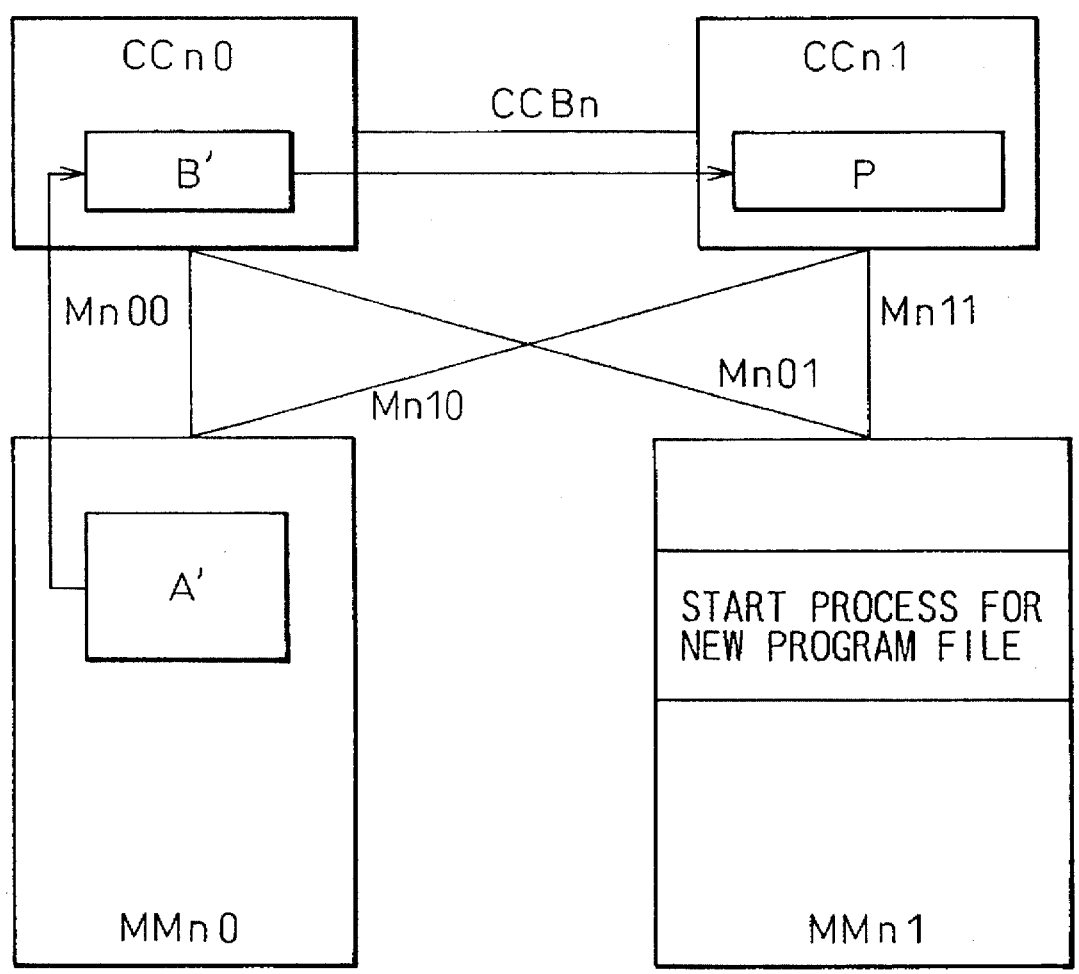
FIG. 7 is a view for explaining procedures of a start means for the new program file.

FIG. 7 is a view for explaining procedures of the start means for the new program file. The same reference numbers used in FIG. 6 are attached to the same components in this drawing. A' denotes the start means for the new program file, B' denotes another CPU start means, P denotes the program counter, and the bus line CCBn denotes an access bus between the CCn0 and the CCn1 of the CPU.

In the CCn0 of the CPU-G0, the other CPU start means B' sets the start address for starting the initial process of the new program file to the program counter P of the CCn1 of the CPU-G1 in accordance with the start instruction from the new program file start means A' of the MMn0 in the CPU-G0, and starts the initial process of the new program file of the CCn1 of the CPU-G1.

(5) New Program File Active Means

The active CPU of the particular processor sets the start address for changing the new program file to the active new program file (below, an active process) into the program counter of the stand-by CPU by using the switch means of the active CPU in the duplex processor, and starts the stand-by CPU.

The switch means for the active CPU in the duplex processor is provided for switching the active CPU to the stand-by CPU, and for switching the stand-by CPU to the active CPU.

The active CPU of the particular processor starts the stand-by CPU, and sends an instruction for changing the new program to the active program file (below, an active instruction) to the active CPU of each processor. The active CPU of each processor, which received the switch instruction for the new program, sets the start address for the active process by using the switch means of the active CPU in the duplex processor, and starts the stand-by CPU.

Figure 8:
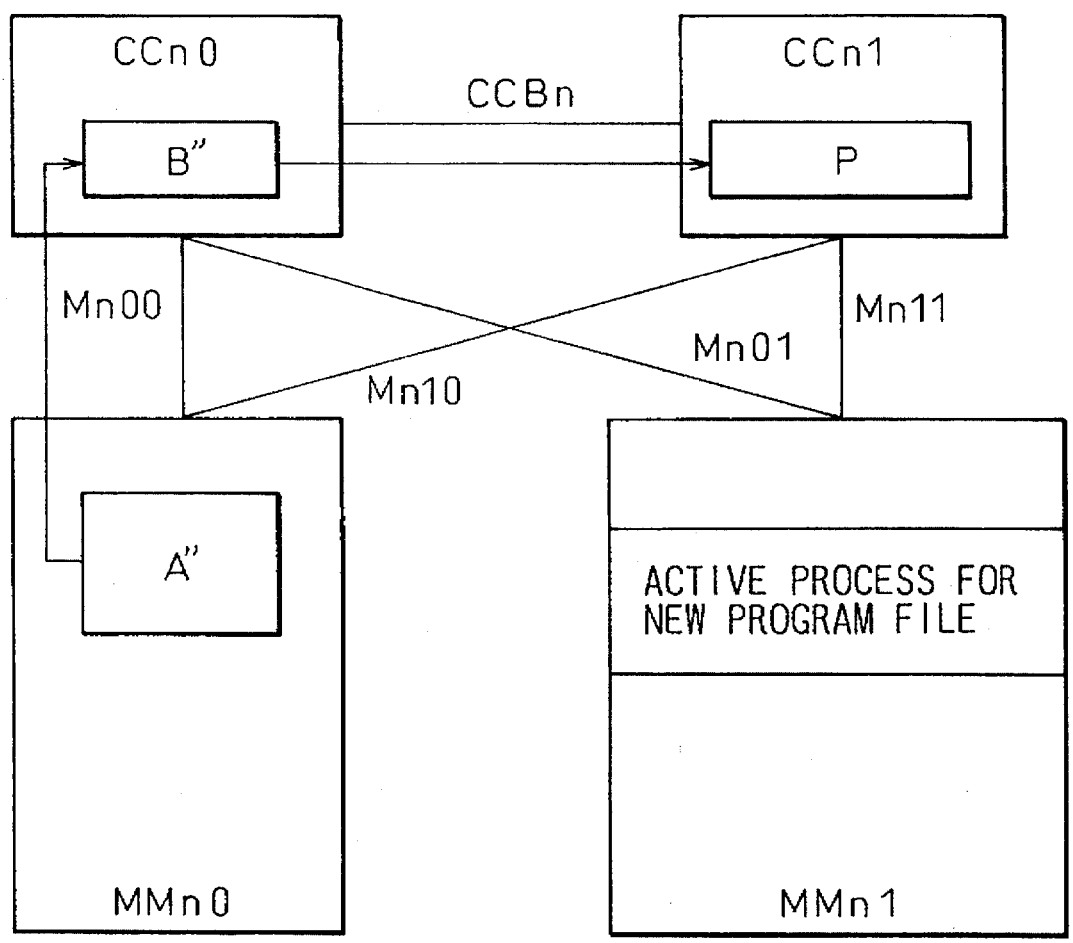
FIG. 8 is a view for explaining procedures of an active means for changing the program file to the active new program file.

FIG. 8 is a view for explaining procedures of the active means for changing the program file to the active new program file. The same reference numbers used in FIG. 7 are attached to the same components in the drawing. A" denotes the active means for changing the program file to the active new program file, and B" denotes the switch means for the active CPU.

In the CCn0 of the CPU-G0, the switch means B" of the active CPU sets the start address for starting active process of the new program file to the program counter P in the CCn1 of the CPU-G1 in accordance with the control from the active means A" for the new program file in the MMn0 in the main storage-G0, and starts the active process for the new program file in the CCn1 of the CPU-G1.

(6) Processor Designating Means for Transferring Program Files

A target processor number for transferring the new program file is input by an interface apparatus for the service man connected to the particular processor, and information of the target processor to be transferred is stored in the main storage of the particular processor as a designating flag of the target processor to be transferred. The designating flag is used for identifying the target processor by the new program file transfer means 8.

Figure 9:
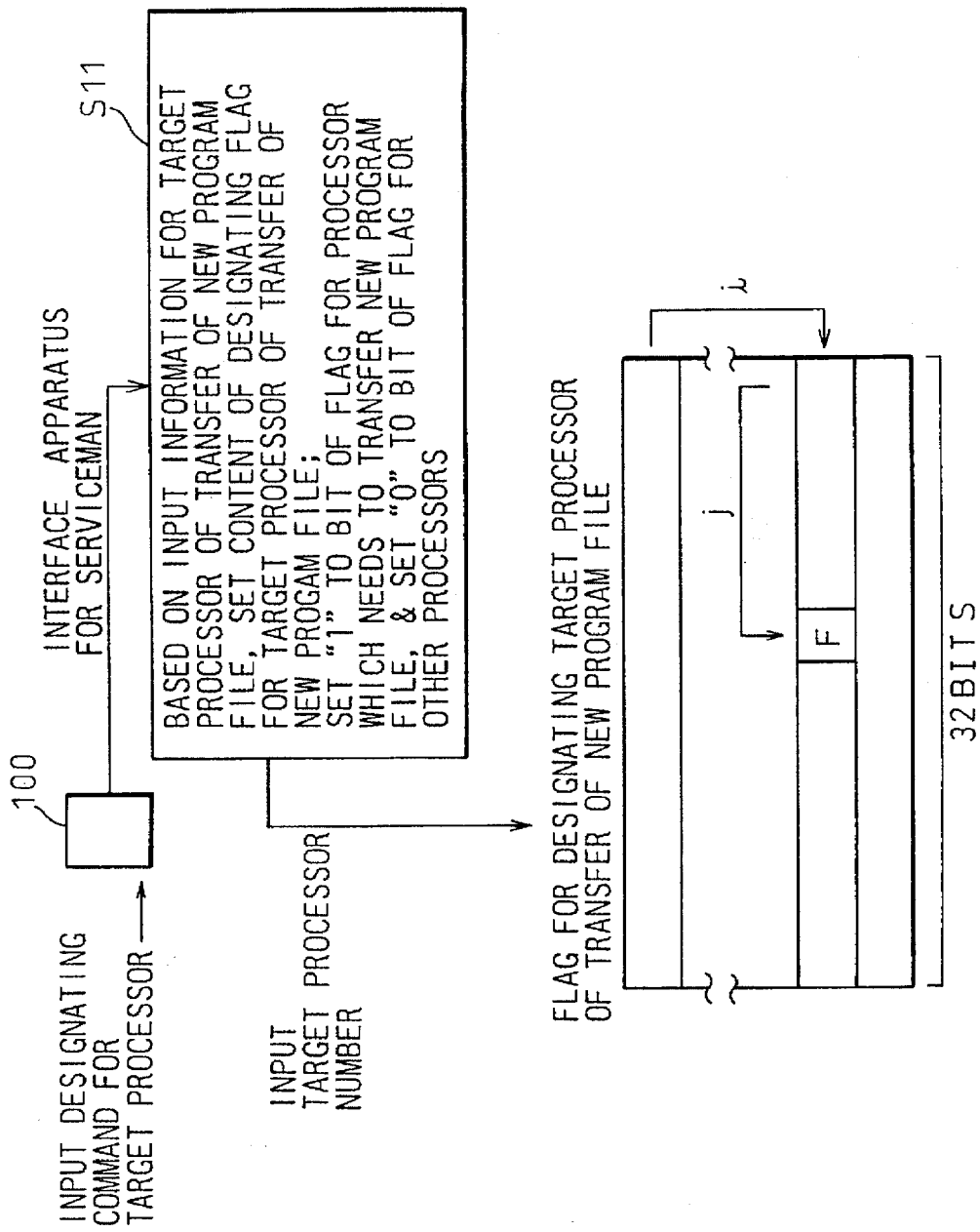
FIG. 9 is a view for explaining a method for designating a target processor for transferring the new program file.

FIG. 9 is a view for explaining a method for designating a target processor for transferring the new program file. Reference number 110 denotes an interface apparatus for the service man. A designating command for designating the target processor and a target processor number are input to the interface apparatus 110. Based on the target processor information for the new program file, the contents of the target processor designating flag for the new program file are set on the main storage of the particular processor as shown in step S11.

The designation of the target processor for transferring the new program file is performed by setting "1" to a flag bit "F" for the processor which needs to transfer the new program file, and by setting "0" to the flag bit "F" for the processor which does not need to transfer the new program file. In this case, the flag bit "F" designates the processor number=$32 \times i + j$ as an index as shown in the drawing.

(7) Transfer Program File Designating Means

The program file is stored in a program file storage 100 in the form of a tree structure.

Figure 10:
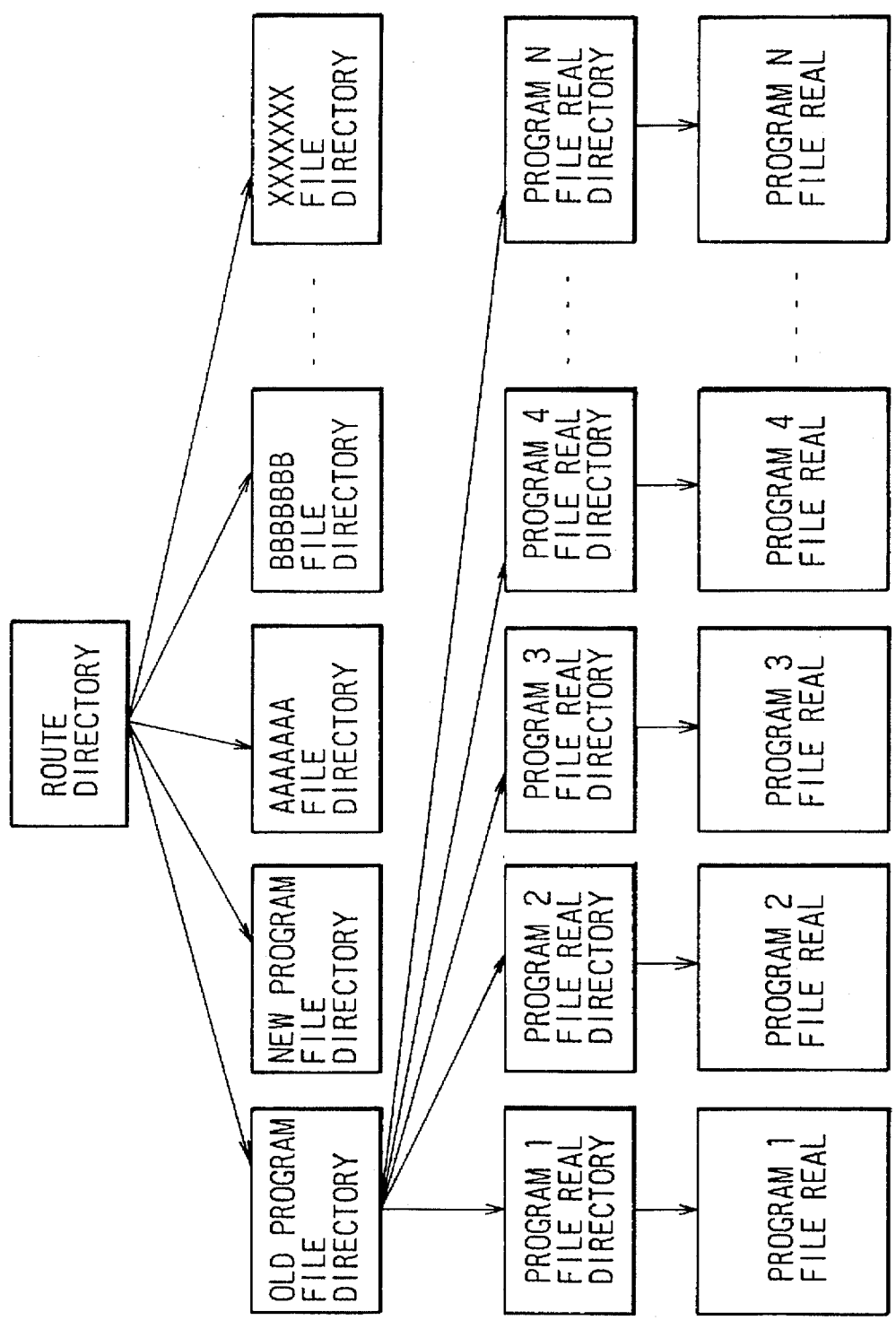
FIG. 10 shows a structure of a program file in data storage.

FIG. 10 shows a structure of a program file in a data storage. As shown in the drawing, a route directory of the program file is classified into an old program file directory, a new program file directory, and a plurality of file directories from AAAAAAA to XXXXXXX. Further, the old program file directory is classified into a plurality of file real directories from program 1 to program N, and each file real directory stores a file real of the program.

Figure 11:
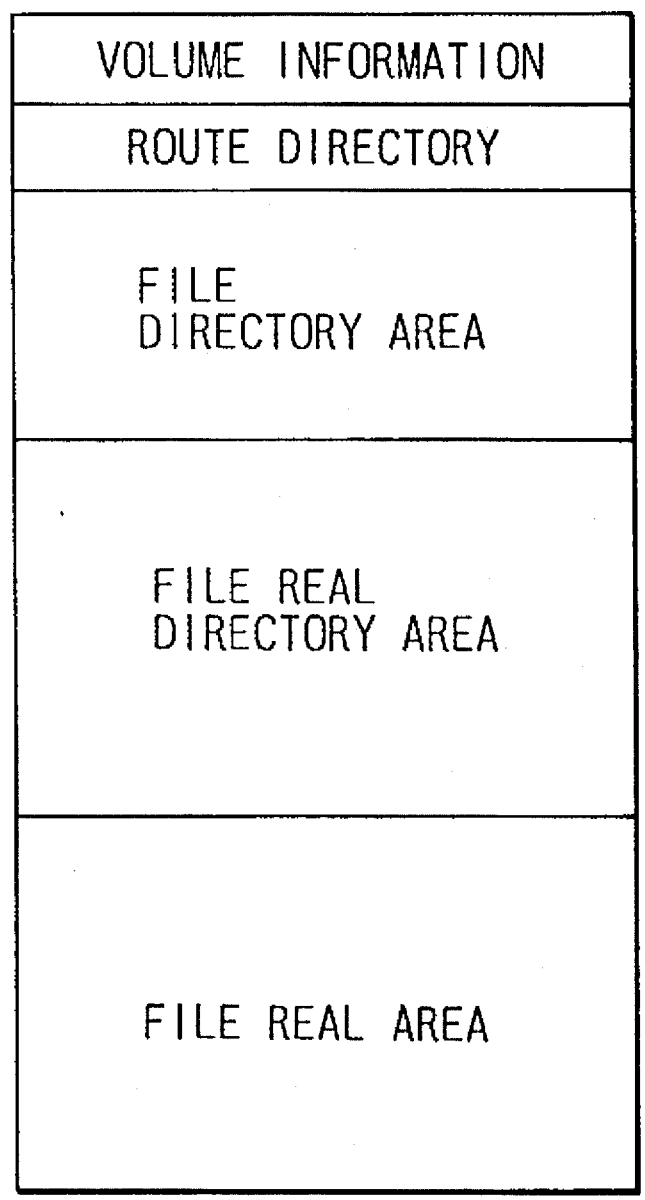
FIG. 11 is a view for explaining an arrangement of a program file in data storage.

FIG. 11 is a view for explaining an arrangement of a program file in the data storage. The program file is formed by; a volume information area which stores management information of each area; a route directory area which defines a start point of each area; a file directory area for each program file; a file real directory area which classifies each program file; and a file real area.

The transfer program file designating means 7 designates the program file number of the program file shown in FIG. 10, and identifies an object program to be transferred.

The program number which needs to transfer in the new program file is input by the interface apparatus for the service man connected to the particular. As a result, the object program information to be transferred is stored into the main storage of the particular processor as the object program designation flag to be transferred. The transfer program file designating means 7 refers to this flag in order to identify the transfer object program to be transfer.

Figure 12:
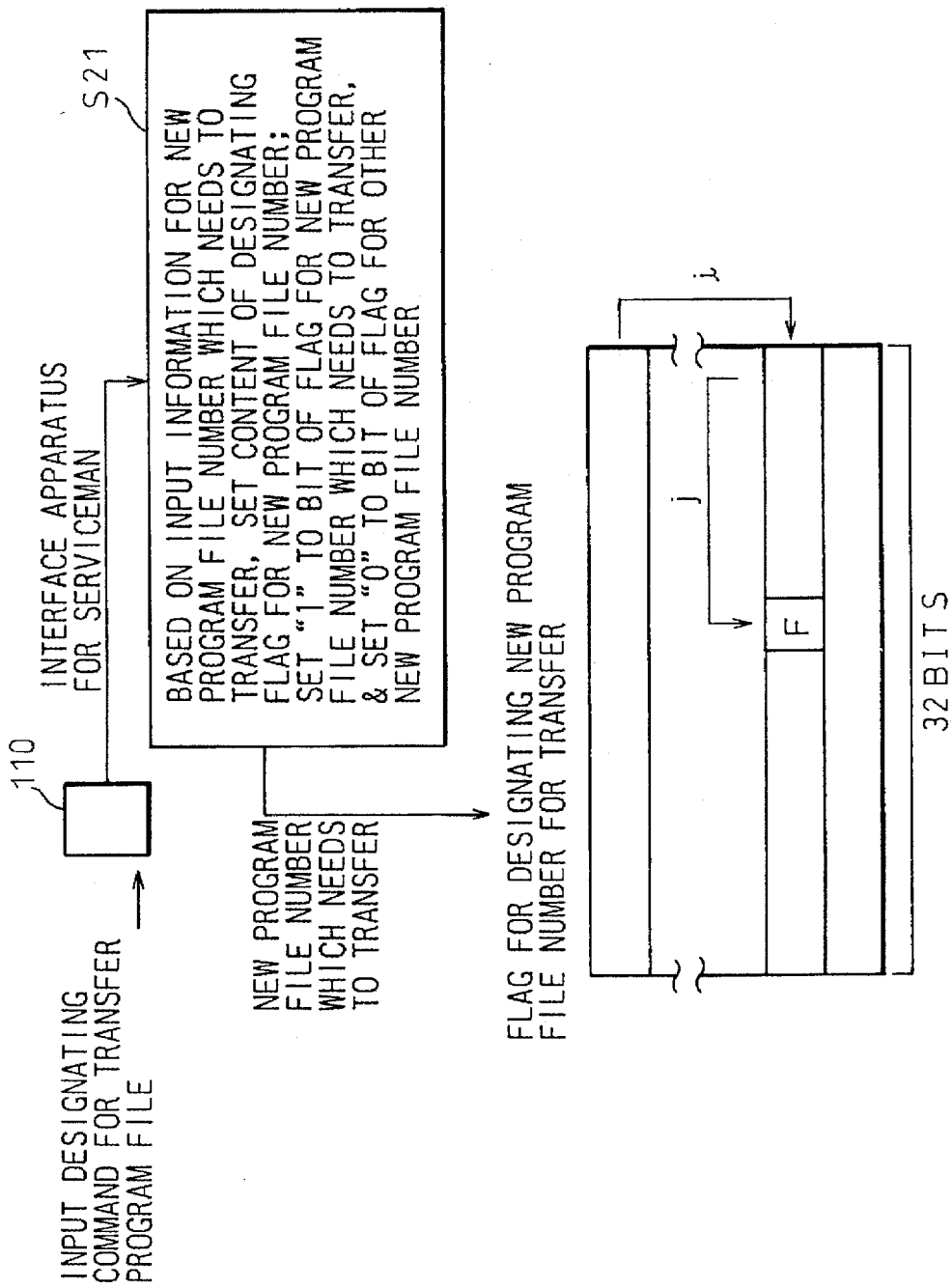
FIG. 12 is a view for explaining a designating method for designating an objected program file to be transferred.

FIG. 12 is a view for explaining a designating method for designating an object program file to be transferred. A designation command for designating the program file to be transferred is input by the interface apparatus for the service man, and a new program file number which must be transfer red is input thereto. Further, the contents of the new program file number designating flag for designating the new program file number are set to the main storage of the particular processor (see step S21).

The new program file number which needs to transfer is designated by setting "1" to the flag bit "F" for the processor which needs to transfer the new program file, and by setting "0" to the flag bit "F" for the processor which does not need to transfer the new program file. In this case, the flag bit "F" designates the processor number=32×i+j as the index.

(8) New Program File Transfer Means

The new program file transfer means transfers the whole or designated portions of the new program file to all processors, which forms the system, or the target processors which are designated.

The new program file transfer means 8 is started for every target processor to be transferred, and transfers the new program file on the active communication path between the particular processor and the target processor to be transferred.

The new program file edits a data transfer order for transferring the new program file to the data portion DATA in the data format shown in FIG. 5A so that the data transfer order is transferred. A result of the transfer of the order is returned by editing a received resultant order of the new program file into the data portion DATA of the format shown in FIG. 5A.

Figure 13:
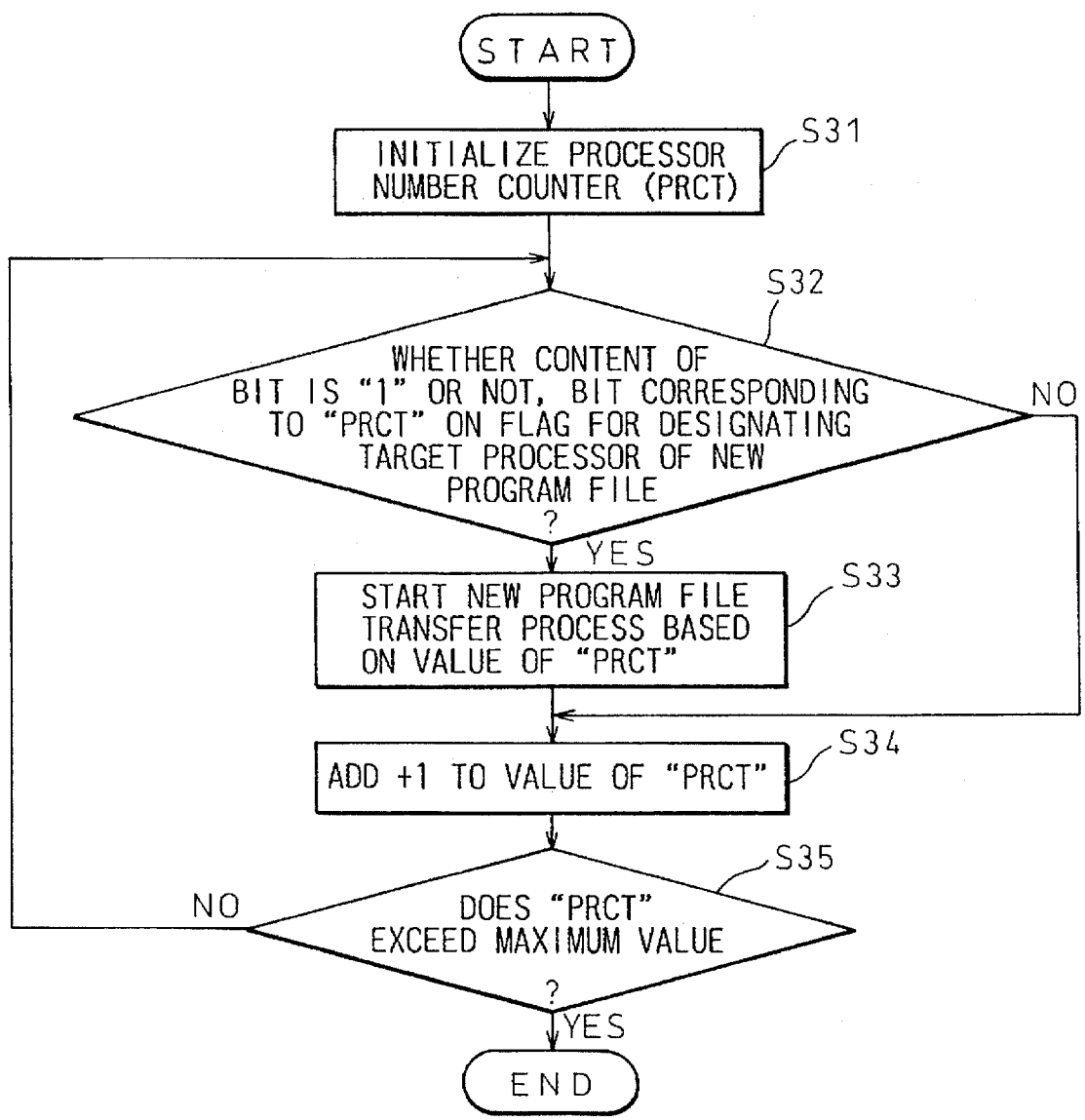
FIGS. 13 and 14 are flowcharts for explaining transfer of new program file.
Figure 14:
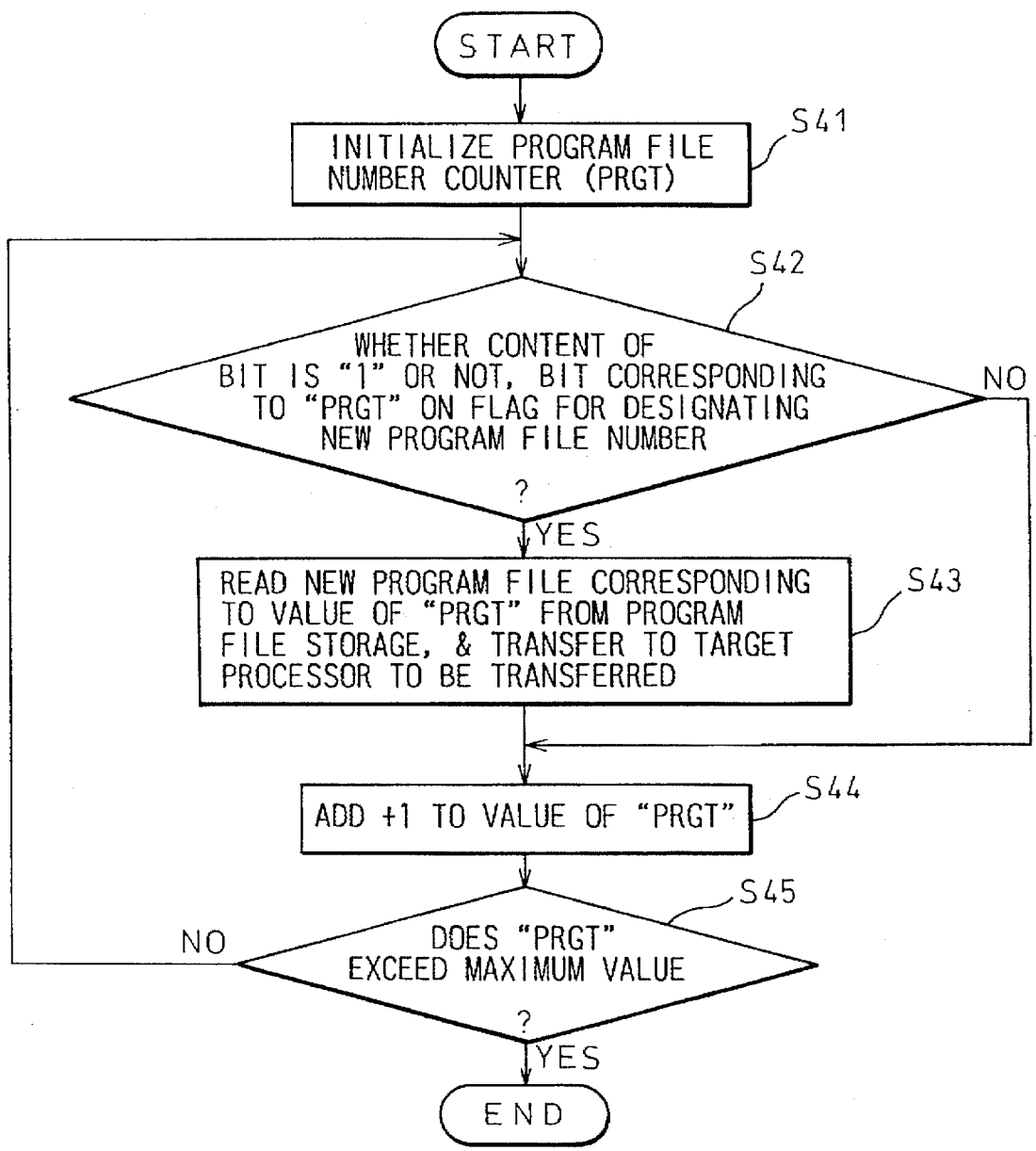

FIGS. 13 and 14 are flowcharts for explaining transfer of new program file. That is, FIG. 13 shows a first transfer process for every processor (steps S31 to S35), and FIG. 14 shows a second transfer process for every program file (steps S41 to S45).

In the first transfer process shown by steps S31 to S35 in FIG. 13, when the bit corresponding to a value of the processor number counter (PRCT) is "1" on the designating flag for designating the target processor for the new program file, first, the value of the processor number counter is used as the input value, next, the second transfer process for the new program file is started. The steps S32 to S35 are repeated until the value of the PRCT exceeds the maximum value.

In the second process shown by steps S41 to S45 in FIG. 14, when the bit corresponding to a value of the program file number counter (PRCT) is "1" on the designating flag for designating the program file for the new program file, the new program file corresponding to the value of the PRGT is read from the program file storage and transferred to the target processor (step S43). The steps S42 to S45 are repeated until the value of the PRGT exceeds the maximum value.

Figure 15:
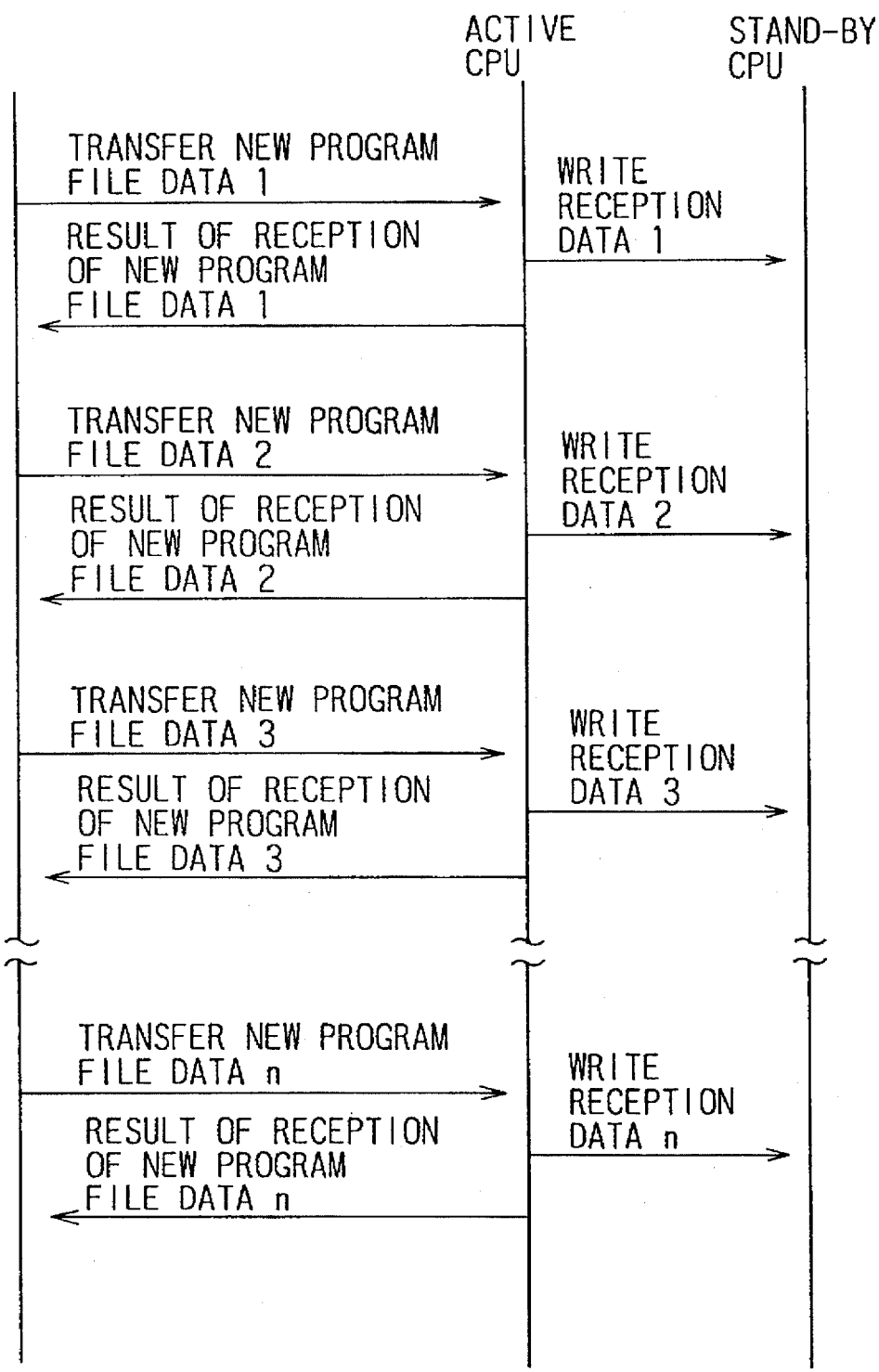
FIG. 15 shows a transfer sequence for the new program file between a source processor for the transfer of data and a target processor to be transferred.

FIG. 15 shows a transfer sequence for the new program file between a source processor and a target processor to be transferred. Further, this drawing shows the transfer sequence between the active CPU and the stand-by CPU in the target processor. As shown in the drawing, the source processor transfers the new program file data to the target processor, and the target processor returns the result of reception of the new program file data to the source processor. Further, in the target processor, the reception data are written from the active CPU to the stand-by CPU.

FIG. 16A is a view for explaining a format of a data transfer order for transferring the new program file, and FIG. 16B is a view for explaining a format of a received result order for the new program file. These data formats are transferred by the data section DATA of FIG. 5 by editing the data format of FIGS. 16A and 16B into the data section DATA. An identifier, a serial number, a file number, an address, and the byte number of the transfer data are formed by four bytes in this embodiment.

In FIG. 16A, "F" is formed by four bits of data. When F is "0", it indicates a head data. When "1", it indicates intermediate data. When "15", it indicates the last data.

In FIG. 16B, when the received result is "0", it indicates good result of data reception and write. When the received result is not "0", it indicates a failure of data reception and write.

(9) Input Command Automatic Transfer Means

The input command automatic transfer means operates in such a way that, in synchronous operation of the new and old program files, when a command, which is registered in a command table for automatic transfer, is input to the old program file side, the command is automatically input to the new program file side.

The operation of the input command automatic transfer means is started by inputting a start command for automatic transfer from the interface apparatus for the service man, and is completed by inputting a finish command for automatic transfer.

An objected command for automatic transfer, which is input from the old program file side, is written into a communication area in the new and old program files on the main storage. In the write operation, a write counter is updated, and an input command character string is written in the communication area. In the new program file side, the check process for the communication area is periodically started in order to compare the write counter with the read counter. When there are write data in the write counter, the write data are taken into the read counter until the read counter coincides with the write counter so that the command process is started.

Figure 17:
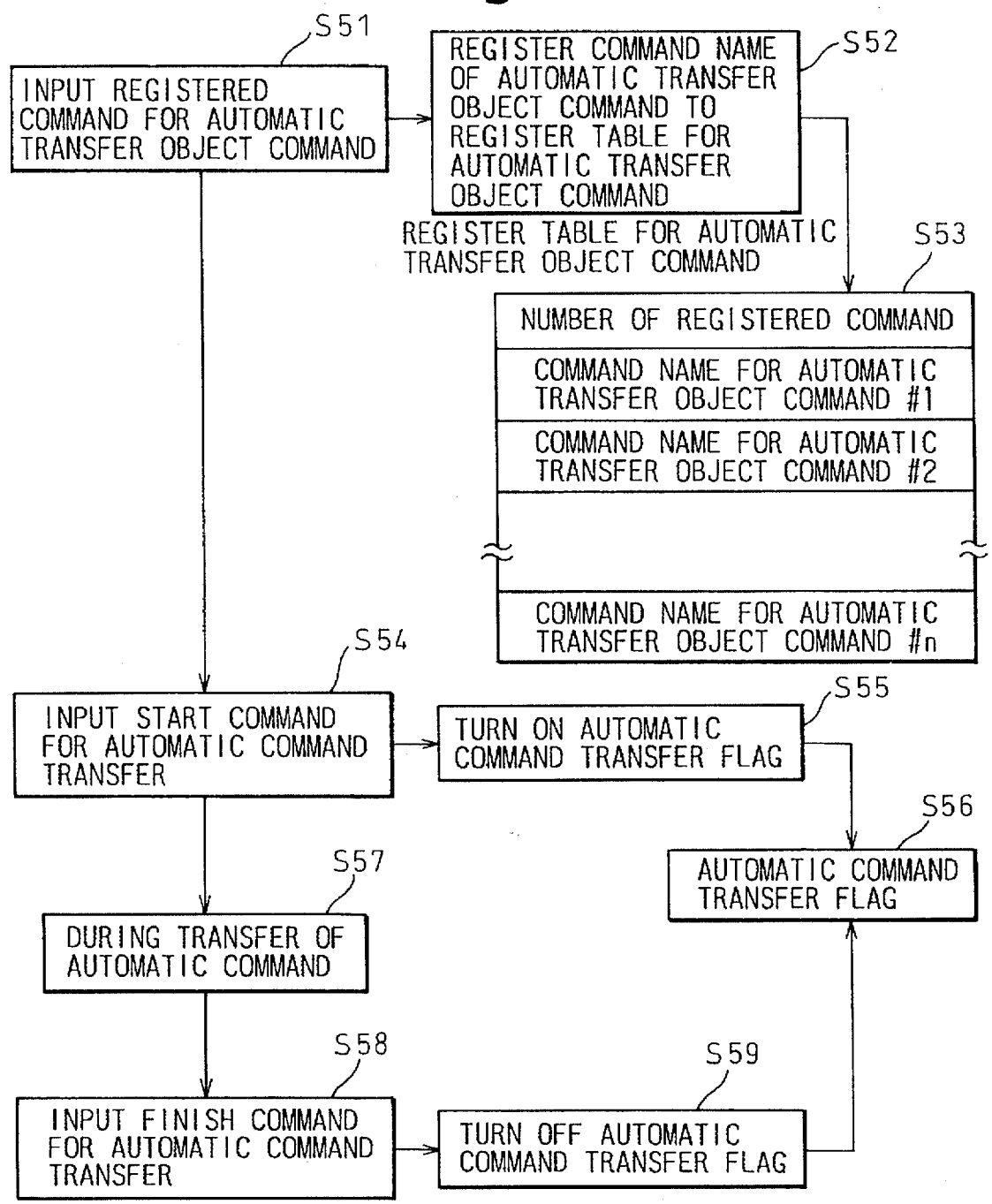
FIG. 17 shows a start process sequence for an automatic command transfer.

FIG. 17 shows a start process sequence for an automatic command transfer. As shown by steps S51 to S59, first, by inputting a registered command for automatic transfer objected command, a command name of the automatic transfer objected command is registered into the register table for the automatic transfer objected command. Further, by inputting a start command for the automatic transfer, the automatic command transfer flag is set to "on" (all flags are set to "1"). Further, by inputting a finish command for automatic transfer at the finish of automatic command transfer, the automatic command transfer flag is set to "off" (all flags are "0").

Figure 18:
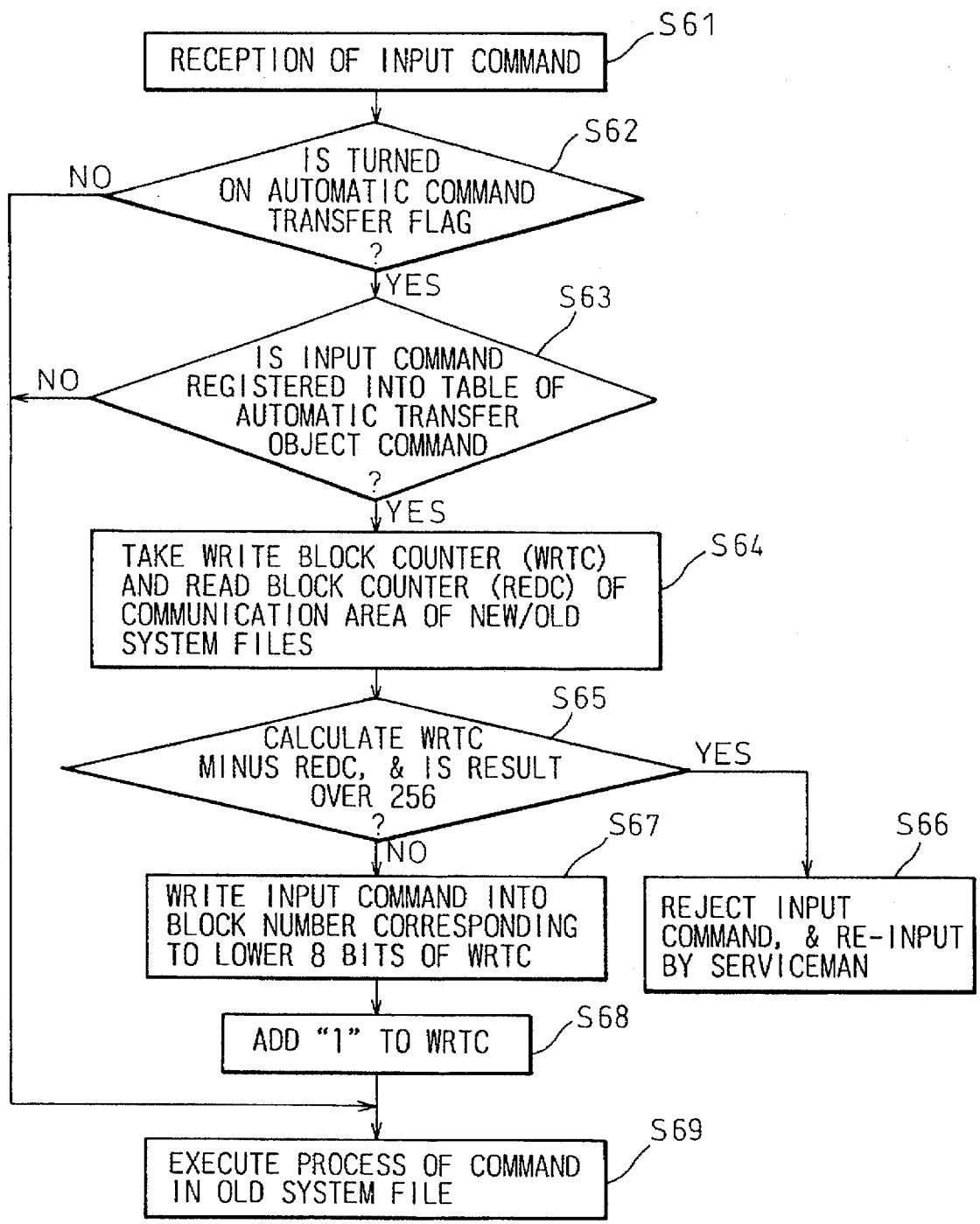
FIG. 18 is a process flowchart for an automatic command transfer in the old program file.

FIG. 18 is a process flowchart for automatic command transfer in the old program file side. As shown by steps S61 to S69, in the reception of the input command, the automatic command transfer flag is "on". When the input command is registered into the automatic transfer command table, the contents of the write block counter (WRTC) and the read block counter (REDC) in the communication area of the new and old system files are taken therefrom.

Further, the difference between the write block counter and the read block counter (i.e., WRTC-REDC) is calculated. When the result is under 256, the input command is written to the block number corresponding to the lower eight bits of the write block counter WRTC, and steps for sequentially carrying up the WRTC are repeated so that the command process is performed in the old system file side. On the other hand, when the result of calculation for the difference (i.e., WRTC-REDC) exceeds 256, the input command is rejected since the command cannot be written into the communication area. After rejection, re-input of the command is offered to the service man.

Figure 19:
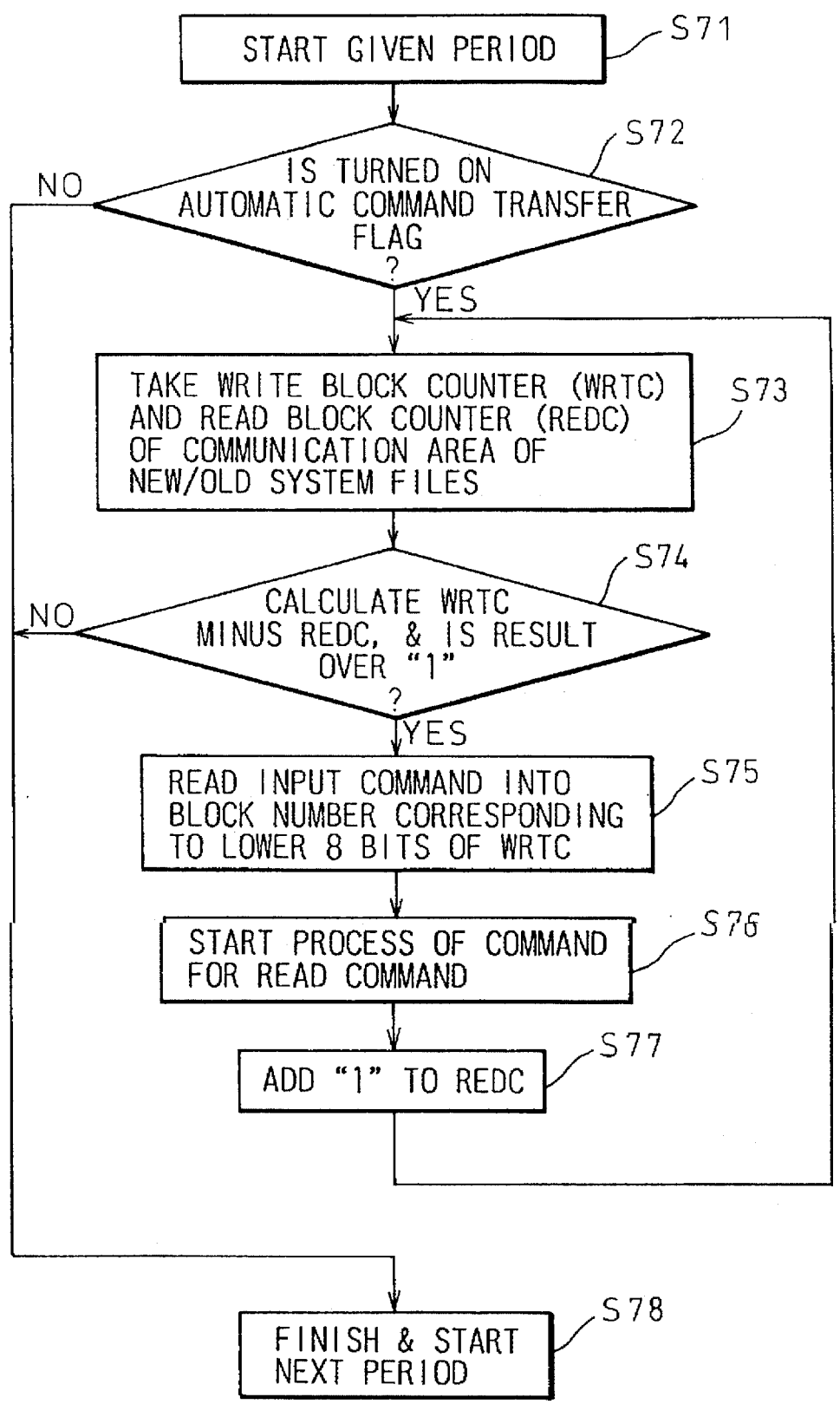
FIG. 19 is a process flowchart for executing a transfer command in the new file system.

FIG. 19 is a process flowchart for executing a transfer command in the new file system side. As shown by steps S71 to S78, first, when the automatic command transfer flag is "on" in periodic start, the write block counter WRTC and the read block counter REDC in the communication area are taken therefrom, and the difference therebetween is calculated.

When the result exceeds "1", the command in the block number corresponding to the lower eight bits of the read block counter is read, and the command process is started. Further, steps for sequentially counting up the read block counter are repeated. The steps are continued until the result of calculation of the difference (i.e., WRTC-REDC) becomes less than "1".

Figure 20:
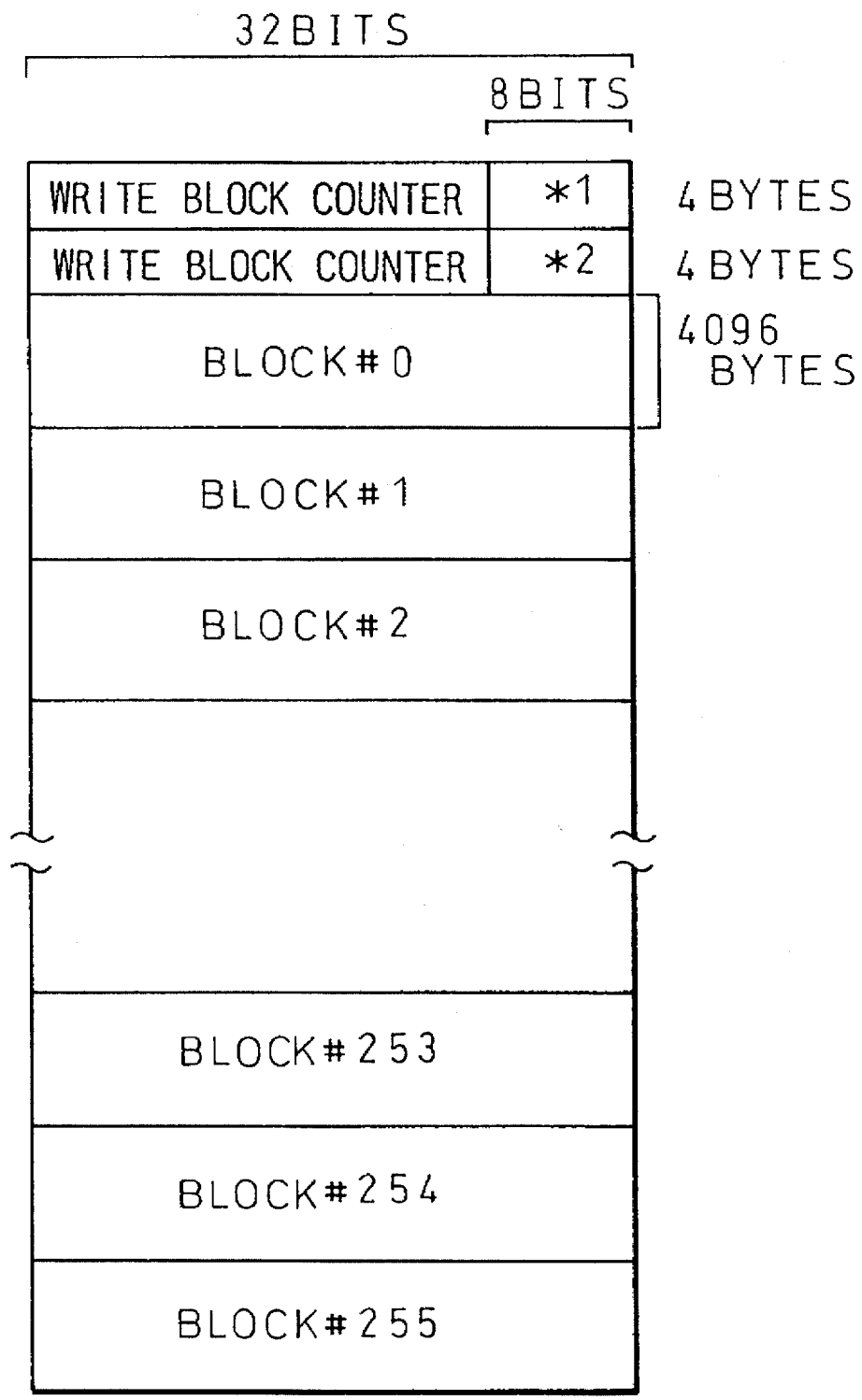
FIG. 20 shows a structure of communication areas in the new and old program files.

FIG. 20 shows a structure of communication areas in the new and old program files. The communication area is formed by write block counters and a plurality of blocks #0 to #255, and each block has 4096 bytes. In the drawing, a mark "*1" in the write block counter represents the number of the block which is most recently written therein. On the other hand, the mark "*2" in the write block counter represents the number of the block which is most recently read out.

Each block number has eight bits.

(10) Data Following/Converting Means

The data following/converting means performs data conversion process in such a way that, in the synchronous operation of the new and old program files, the data following/converting means follows (or, takes over) the data of the old program file side to the new program file side by using the input command.

The operation of the data following/converting means is started by inputting a data following/converting start command from the interface apparatus for the service man, and completed by inputting a data following/converting finish command.

Based on the data following/converting command which is input in the old program file side, the objected data to be converted and a kind of data are written into the data following area in the new and old program files on the main storage. At the same time, the write counter is updated in accordance with the amount of the following data.

In the new program file side, the area check process is periodically started in order to compare the write counter with the read counter. When there are write data in the write counter, the write data is taken until the read counter coincides with the write counter, and the data following/converting process, which corresponds to the kind of data, is started.

Figure 21:
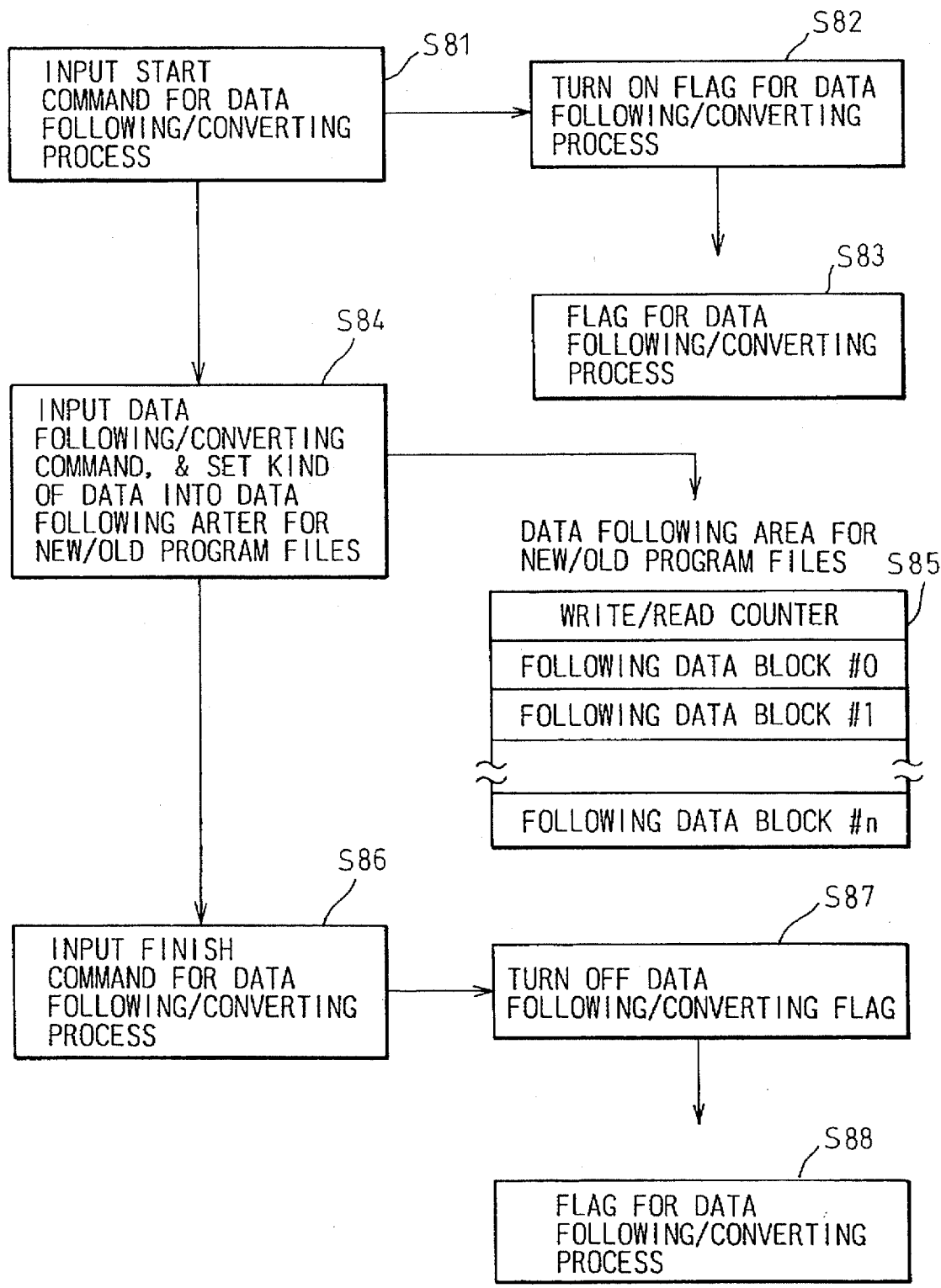
FIG. 21 is a sequence for explaining data following/converting process.

FIG. 21 is a sequence for explaining data following/converting process. As shown by steps S81 to S88, by inputting the data following/converting start command, a data following/converting flag is "on" (all flags are "1"). Next, the data following/converting command is input, the objected data for the following/converting process and the kind of data are set to the data following area for the new and old program flags. These steps are repeated for objected data for following/converting process. After completion of process, by inputting the data following/converting finish command, the data following/converting flag is "on" (all flags are "0").

Figure 22:
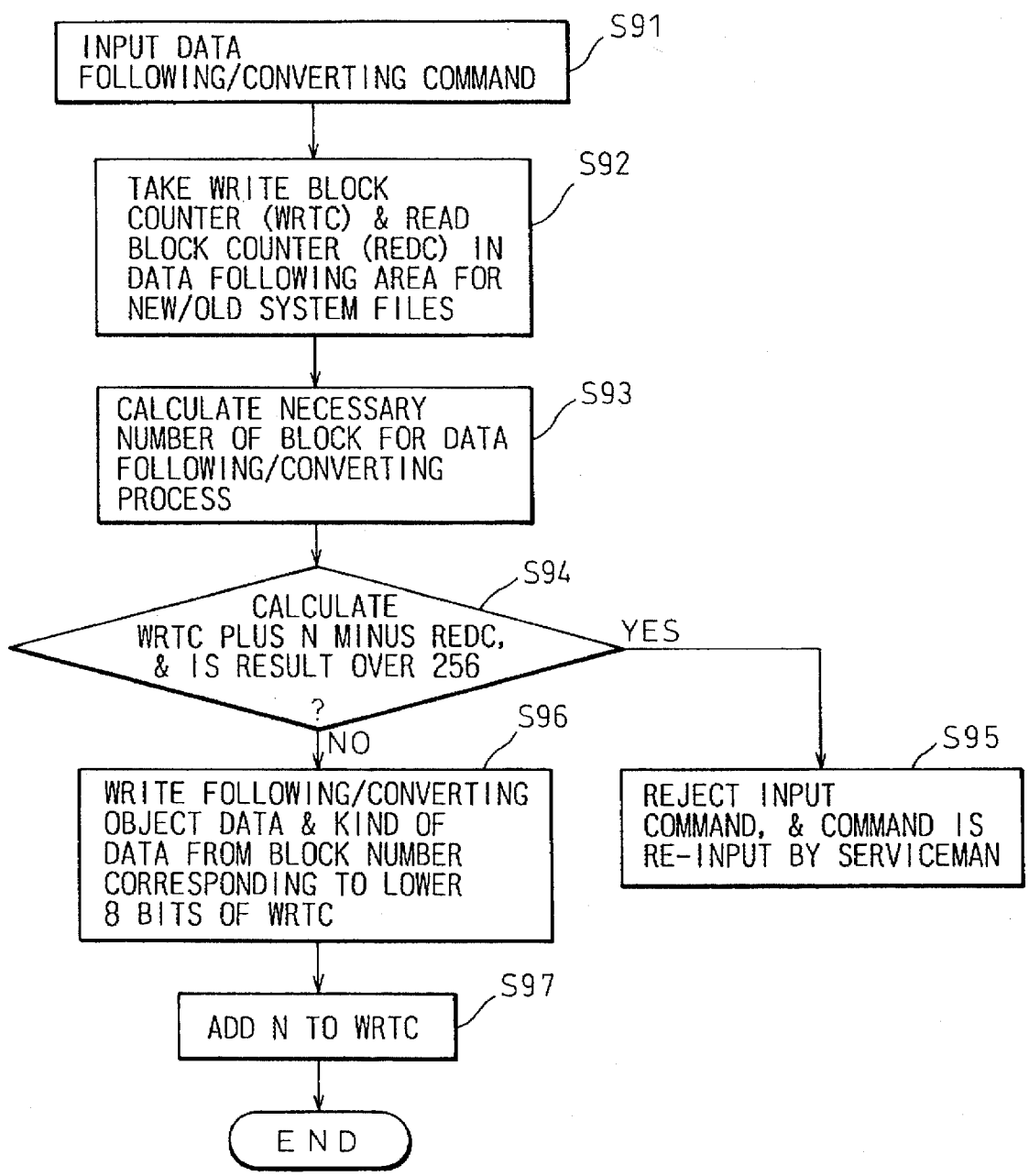
FIG. 22 is a flowchart for explaining data following command process in an old program file.

FIG. 22 is a flowchart for data following command process in the old program file side. As shown by steps S91 to S97, by inputting the data following/converting command, the numbers of blocks, which needs to follow/convert, are calculated (i.e., the difference between the WRTC and the REDC is calculated) by taking the write block counter (WRTC) and the read block counter (REDC) in the data following area in the new and old system file.

When the result is under 256, the following/converting objected data and the kind of data are written from the block number corresponding to the lower eight bits of the write block counter, and steps are completed by adding "N" to the write block counter WRTC. On the other hand, the result of calculation for the difference exceeds 256, the input command is rejected since the command cannot be written into the communication area. After rejection, the re-input of the command is offered to the service man.

Figure 23:
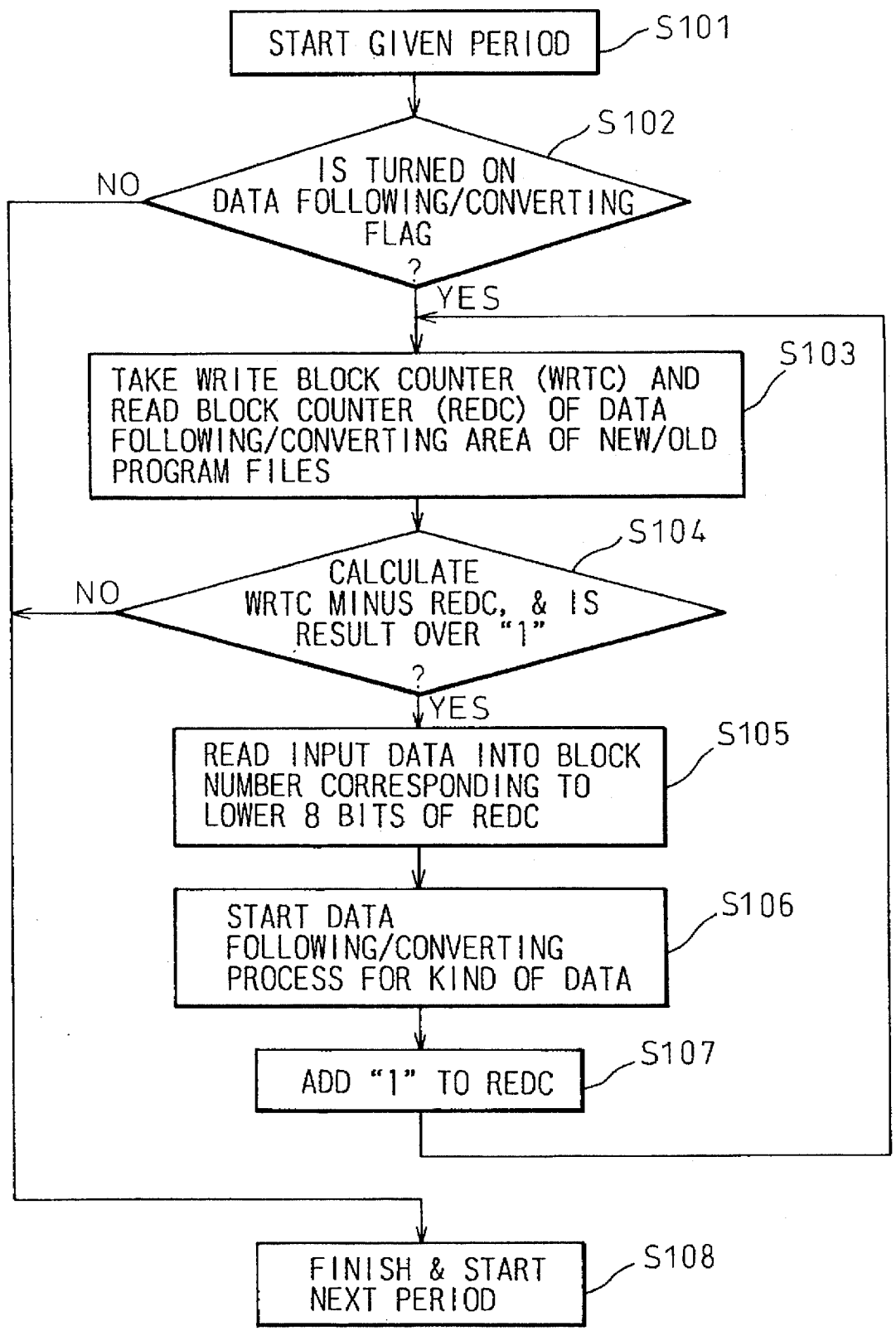
FIG. 23 is a flowchart for explaining data following/converting process in the new program file.

FIG. 23 is a flowchart for data following/converting process in the new program file side. As shown by steps S101 to S108, when the data following/converting flag is "on" in a periodical start, the difference (WRTC-REDC) is calculated by taking the write block counter (WRTC) and the read block counter (REDC) in the data following area for the new and old program file.

When the result exceeds "1", the data in the block number corresponding to the lower eight bits of the read block counter is read out, and the data following/converting process corresponding to the kind of data is started. Further, steps for sequentially counting-up the read block counter are repeated. The process is continued until the result of calculation of the difference becomes less than "1".

Figure 24:
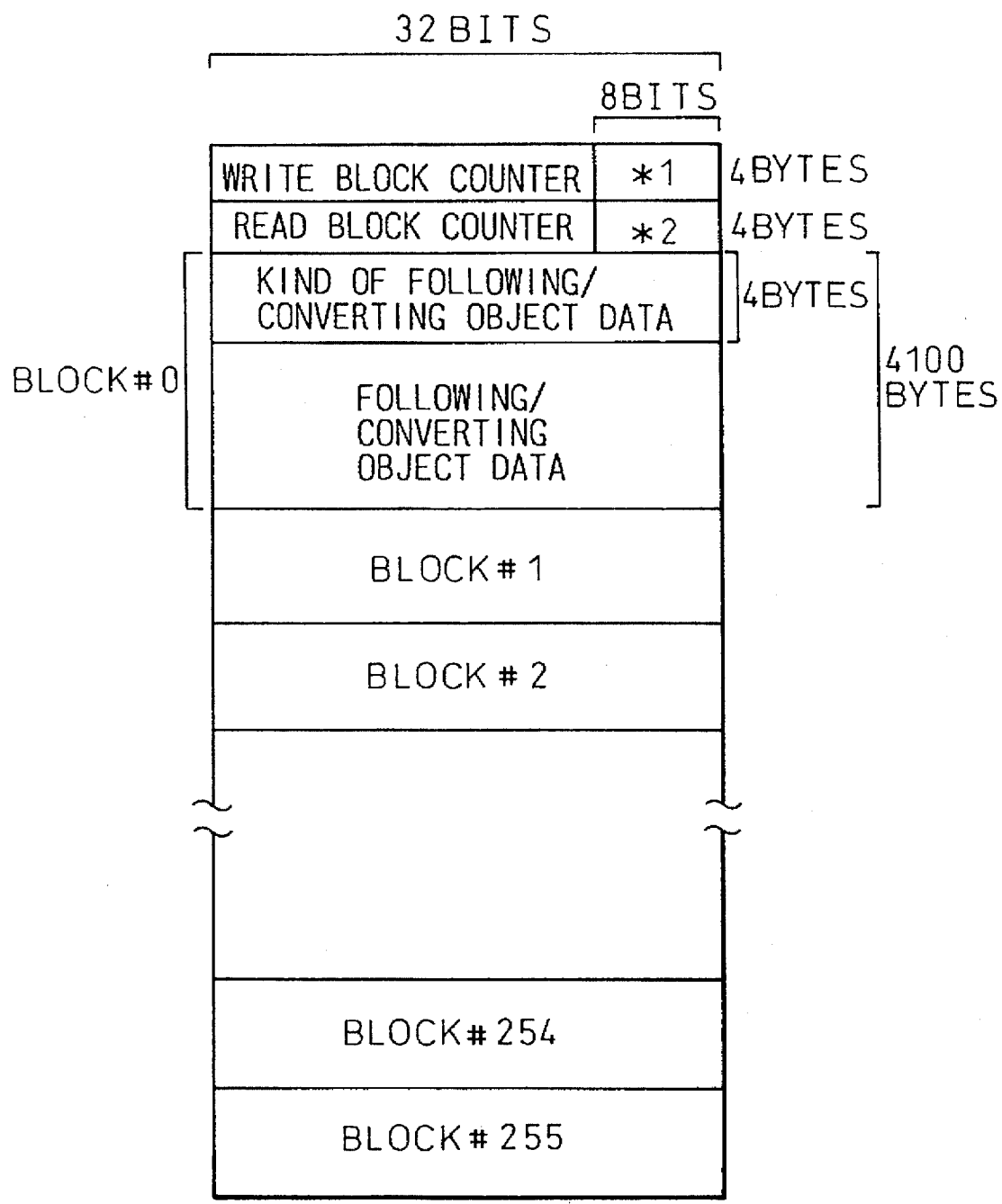
FIG. 24 shows a structure of data following areas in the new and old program files.

FIG. 24 shows a structure of data following areas in the new and old program files. The data following area is formed by the write block counter and the read block counter, and a plurality of blocks #0 to #255. Each block has 4100 bytes consisting of four bytes for kind of data and 4096 bytes for objected data. In the drawing, the mark "*1" in the write block counter represents the number of the block which is most recently written. On the other hand, the mark "*2" in the read block counter represents the number of the block which is most recently read out.

The switching procedures from the old program file to the new program will be explained in detail below.

(1) The command is input from a work station WS10 (see FIG. 2), and a state of each apparatus is set as follows.

* The CPUs CC10, and CC20 to CCn0 are set to the active apparatus.

* The main storages MM10 and MM20 to MMn0 are set to the active apparatus. (The main storage connection buses M100 and M200 to Mn00 are connected to the active CPU.)

* The channel control apparatuses CH10 and CH20 to CHn0 are set to the active apparatus. (The channel control apparatus connection buses C100 and C200 to Cn00 are connected to the active CPU.)

* The channel interface apparatuses CB10 to CB20 to CBn0 are set to the active apparatus.

* The ring-bus interface apparatus (ring-bus adapter) RB10 and RB20 to RBn0 are set to the active apparatus.

* The communication path between processors on the ring-bus #0 is set to the active path.

* The work station WS10, the magnetic tape apparatus MT10 and the magnetic disk apparatus DK10 are set to the active apparatus.

* The CPUs CC11 and CC21 to CCn1 are set to the waiting state.

* The main storages MM11 and MM21 to MMn1 are disconnected from the active CPU. (The main storage connection buses M101 and M201 to Mn01 are disconnected from the active CPU.)

* The channel control apparatuses CH11 and CH21 to CHn1 are disconnected from the active CPU. (The channel control apparatus connection buses C101 and C201 to Cn01 are disconnected from the active CPU.) As a result, the channel interface apparatuses CB11, CB21 to CBn1, CB13, and CB23 to CBn3 are disconnected from the active CPU.

* The ring-bus interface apparatuses (ring-bus adapters) RB11 and RB21 to RBn1 are disconnected from the active CPU.

* The communication path between processors on the ring-bus #1 are set to the unusable state.

(2) The command is input from the work station WS10, and the main storage disconnected in step (1) is taken into the system in order to coincide the contents of one main storage with that of another main storage. That is,

* The main storage apparatuses MM11 and MM21 to MMn1 are connected to the active CPU, and the contents of the main storage apparatuses MM10 and MM20 to MMn0 are copied.

(3) The command is input from the work station WS10, and the main storage taken in step (2) is disconnected from the active CPU again. That is,

* The main storage apparatuses MM11 and MM21 to MMn1 are disconnected from the active CPU.

(4) The new program file is moved from the magnetic tape apparatus MT10 and the magnetic disk apparatus DK10.

(5) The command is input from the work station WS10, and the target processor number which the new program file is transferred is input. (When the new program file is transferred to all processors, a command parameter which indicates "designation of all processors" is input.)

(6) The command is input from the work station WS10, and the processor number of the program which needs to transfer in the new program file. (When all programs are transferred, a command parameter which indicates "designation of all programs" is input.)

(7) The particular processor (1) reads the new program file from the magnetic disk apparatus DK10 by using the new program file read means, and transfers the new program file to each processor through the active communication path on the ring-bus #0 by using the new program file transfer means. (The particular processor directly sends the new program file of its own processor to the new program file reception means.) The new program file reception means of each processor writes the new program file from the active CPUs CC10 and CC20 to CCn0 to the main storage apparatuses of one system MM11 and MM21 to MMn1 by using another CPU access means.

The other main storage access means temporarily connects the main storage connection buses M101 and M201 to Mn01 between the active CPU and another main storage, to the active CPU, and transfers the write data on the main storage connection bus.

(8) The command is input from the work station WS10, and the new program file, which is written into the main storage of the G1 group, is run on the CPU of the G1 groups by using the new program file start means of each processor.

(9) The CPU of the G1 group in each processor confirms the start of the new program file.

The new program file of the G1 group sets the state of the apparatus and starts the drive as follows.

* The main storages MM11 and MM21 to MMn1 are set to the active apparatus. (The main storage connection buses M111 and M211 to Mn11 are connected to the active CPU for the new program file.)

* The channel control apparatuses CH11 and CH21 to CHn1 are set to the active apparatus. (The channel control apparatus connection buses C111 and C211 to Cn11 are connected to the active CPU for the new program file.)

* The channel interface apparatuses CB13 and CB23 to CBn3 are set to the active apparatus.

* The work station WS11 is set to the active apparatus.

* The ring-bus interface apparatuses RB11 and RB21 to RBn1 are set to the active apparatus.

* The communication path between processors on the ring-bus #1 is set to the active path.

* The main storages MM10 and MM20 to MMn0 are disconnected from the active CPU of the new program file. (The main storage connection buses M110 and M210 to Mn10 are disconnected from the active CPU of the new program file.)

* The channel control apparatuses CH10 and CH20 to CHn0 are disconnected from the active CPU for the new program file. (The channel control apparatus connection buses C110 and C210 to Cn10 are disconnected from the active CPU for the new program file.) As a result, the channel interface apparatuses CB10, CB20 to CBn0, CB12, and CB22 to CBn2 are disconnected from the active CPU for the new program file.

* The ring-bus interface apparatuses RB10 and RB20 to RBn0 are disconnected from the active CPU for the new program file.

* The communication path between processors on the ring-bus #0 are set to the unusable state.

(10) The command is input from the work station WS11, and the running of the new program file is confirmed.

(11) The following processes are executed when needed.

* The automatic command transfer process is started from the work station WS10. This process is the same sequence as described in the item (9) (input command automatic transfer means).

* The data following/converting process is started from the work station WS10. This process is the same sequence as described in the item (10) (data following/converting means).

(12) The new program file switch command is input from the work station WS10, and the new program file is switched to the active file by using the new program file active means.

The following are further embodiments of the present invention. The present invention can apply to either a bus-type or a star-type of the communication bus connecting between processors.

Figure 25:
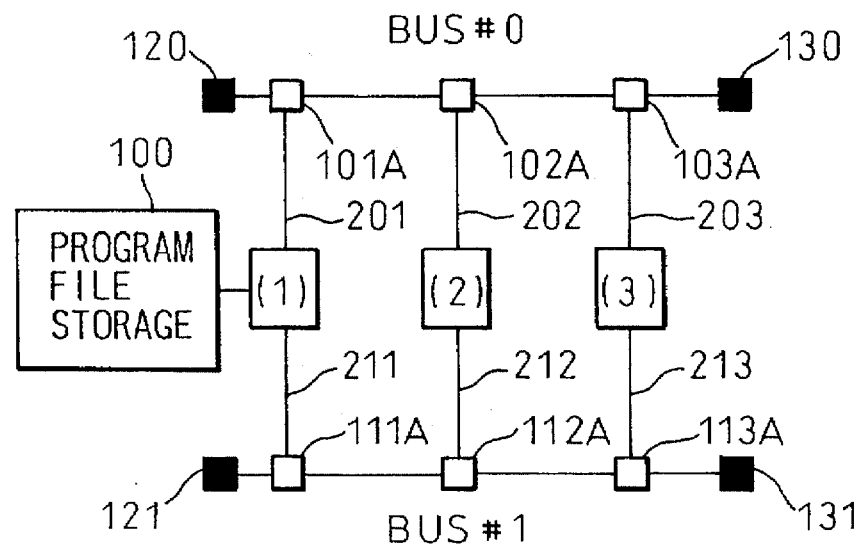
FIG. 25 shows one example of a multiprocessor system connected by bus-type communication buses.

FIG. 25 shows one example of a multiprocessor system connected by bus-type communication buses. The same reference numbers used in FIGS. 3A to 3C are attached to the same components in this drawing. Reference numbers 101A to 103A and 111A to 113A are bus adapters, and 120, 121, 130 and 131 are bus arbiters. Further, (1) to (3) are processors.

In this structure, the processors (1) to (3) are connected to the bus #0 through the bus adapters 101A to 103A so that access lines 201 to 203 are formed between each processor and the bus #0. Further, the processors (1) to (3) are connected to the bus #1 through the bus adapters 111A to 113A so that access lines 211 to 213 are formed between each processor and the bus #1. The bus arbiters 120 and 130 mediates collision of a right to use the bus by each processor on the bus #0. The bus arbiters 121 and 131 mediates collision of a right to use the bus by each processor on the bus #1.

Figure 26:
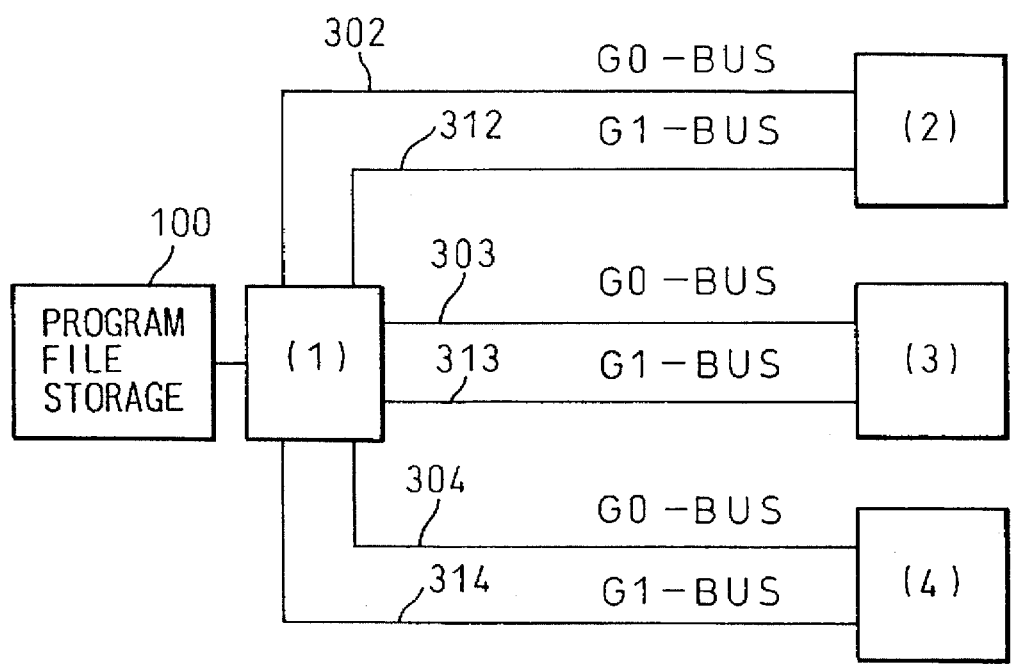
FIG. 26 shows one example of a multiprocessor system connected by star-type communication buses.

FIG. 26 shows one example of a multiprocessor system connected by star-type communication buses. The same reference numbers used in FIGS. 3A to 3C are attached to the same components in this drawing. Reference numbers 302 to 304 and 312 to 314 are communication buses.

In this structure, the processor (1) is connected to the processor (2) by the communication buses 302 and 312, connected to the processor (3) by the communication buses 303 and 313, and connected to the processor (4) by the communication buses 304 and 314. Further, the reference number 100 denotes the program file storage as shown in FIG. 3.

What is claimed is:

1. A method for updating a program file from an old program file to a new program file in a multiprocessor system formed by a plurality of duplex processors, each duplex processor having two processors, one being used as an active processor, and the other being used as a stand-by processor, each processor having at least a central processing unit (CPU) and a main storage, the CPU being able to access the main storage in the other processor of the duplex processor; and each duplex processor being interconnected through communication buses so that it is possible to communicate between any processors, and a particular processor in the duplex processor reading a program file from a program file storage and sending said read program file to each processor; said method comprising:

each duplex processor being able to access each of said communication buses therefrom, being able to identify an usable communication bus for each target processor, setting any communication bus to an active communication path for each target processor, and transmitting/receiving data on the active communication path while setting another communication bus as a stand-by communication path;

during operation of the active CPU using the old program file, reading the new program file to the main storage of the stand-by CPU;

starting the new program file of the stand-by CPU from the active CPU;

communicating between stand-by CPUs by using the stand-by communication path which is set by the active CPU in order to confirm operation of the new program file in the stand-by CPU; and setting all stand-by CPUs to be active CPUs so that the program file is updated from the old program file to the new program file.

2. A method for updating a program file from an old program file to a new program file in a multiprocessor system formed by a plurality of duplex processors, each duplex processor having two processor, one being used as an active processor, and the other being used as a stand-by processor, each processor having at least a central processing unit (CPU) and a main storage, the CPU being able to access the main storage in the other processor of the duplex processor; and each duplex processor being interconnected through communication buses so that it is possible to communicate between any processors, and a particular processor in the duplex processor reading a program file from a program file storage and sending it to each processor; said method comprising:

providing a managing means for determining whether a communication path is usable or not between processors, and determining any one of usable communication paths to an active communication path; a switching means for switching between the active communication path and the stand-by communication path, whereby setting any communication bus to the active communication path for each target processor, and transmitting/receiving data on the active communication path whole setting another communication bus as a stand-by communication path; a reception means for writing the new program file to the main storage of each stand-by CPU; a start means for starting the new program file which is written into the main storage of the stand-by CPU; and an active means for setting the new program file, which is started by the stand-by CPU, to the active new program file;

during operation of the active CPU using the old program file;

starting the new program file, which is read in the main storage of the stand-by CPU, from the active CPU;

communicating between stand-by CPUs by using the stand-by communication path which is set by the active CPU in order to confirm operation of the new program file in the stand-by CPU; and setting all stand-by CPUs to be active CPUs so that the program file is updated from the old program file to the new program file.

3. A method for updating a program file as claimed in claim 1, wherein, a designating means, is provided for designating a target, processor to transfer the new program file by storing information for the target processor to be transferred on the main storage of the particular processor; and said particular processor switches the program file of only the designated processor in accordance with the stored information.

4. A method for updating a program file as claimed in claim 2, wherein, a designating means, is provided for designating a target processor .to transfer the new program file by storing information for the target processor to be transferred on the main storage of the particular processor; and said particular processor switches the program file of only the designated processor in accordance with the stored information.

5. A method for updating a program file as claimed in claim 1, wherein, a designating means is provided for designating a program file to be transferred and for storing an objected program file to be transferred within the new program file on the main storage of the particular processor; copying the old program file on the main storage of the stand-by CPU of each processor; and switching only the objected program file to be transferred to the new program file.

6. A method for updating a program file as claimed in claim 2, wherein, a designating means, is provided for designating a program file to be transferred and for storing an objected program file to be transferred within the new program file on the main storage of the particular processor; copying the old program file on the main storage of the stand-by CPU of each processor; and switching only the objected program file to be transferred to the new program file.

7. A method for updating a program file as claimed in claim 1, wherein, a new program file transfer means is provided for transferring the new program file to be transferred to the target processor; and starting the transfer of the new program file for each target processor in order to transfer the new program file.

8. A method for updating a program file as claimed in claim 2, wherein, a new program file transfer means is provided for transferring the new program file to be transferred to the target processor; and starting the transfer of the new program file for each target processor in order to transfer the new program file.

9. A method for updating a program file as claimed in claim 1, wherein, an automatic transfer means is provided for an input command for automatically transferring the input command from the old program file side to the new program file side; and during operation of the active CPU by the old program file, inputting a particular command, which is input to the old program file side, to the new program file side in order to start input command.

10. A method for updating a program file as claimed in claim 2, wherein, an automatic transfer means is provided for an input command for automatically transferring the input command from the old program file side to the new program file side; and during the operation of the active CPU by the old program file, inputting a particular command, which is input to the old program file side, to the new program file side in order to start input command.

11. A method for updating a program file as claimed in claim 1, wherein, a data following/converting means is provided for following the data of the old program file side to the new program file side based on the input command, and for converting the data followed by the above into data of the new program file side; during operation of the old program file by the active CPU, transferring the followed data of the old program file side to the new program file; in the new program file side, converting the followed data to the data used for the new program file side; and following the new program file.

12. A method for updating a program file as claimed in claim 2, wherein, a data following/converting means is provided for following data of the old program file side to the new program file side based on the input command, and for converting the data followed by the above into data of the new program file side; during operation of the old program file by the active CPU, transferring the followed data of the old program file side to the new program file; in the new program file side, converting the followed data to the data used for the new program file side; and following the new program file.

13. A multiprocessor system formed by a plurality of duplex processors, each duplex processor having two processor, one being used as an active processor, and the other being used as a stand-by processor, each processor having at least a central processing unit (CPU) and a main storage, the CPU being able to access to the main storage in the other processor of the duplex processor; and each duplex processor being interconnected through communication buses so that it is possible to communicate between any processors, and a particular processor in the duplex processor reading a program file from a program file storage and sending it to each processor; said system comprising:

means provided in each duplex processor, being able to access each of communication buses therefrom, being able to identify an usable communication bus for each target processor, setting any communication bus to an active communication path for each target processor, and transmitting/receiving data on the active communication path while setting another communication bus as a stand-by communication path;

means for, during operation of the active CPU using the old program file, reading the new program file to the main storage of the stand-by CPU;

means for starting the new program file of the stand-by CPU from the active CPU;

means for communicating between stand-by CPUs by using the stand-by communication path which is set by the active CPU in order to confirm operation of the new program file in the stand-by CPU; and means for setting all stand-by CPUs to the active CPU so that the program file is updated from the old program file to the new program file.

14. A multiprocessor system formed by a plurality of duplex processors, each duplex processor having two processor, one being used as an active processor, and the other being used as a stand-by processor, each processor having at least a central processing unit (CPU) and a main storage, the CPU being able to access the main storage in the other processor of the duplex processor; and each duplex processor being interconnected through communication buses so that it is possible to communicate between any processors, and a particular processor in the duplex processor reading a program file from a program file storage and sending it to each processor; said system comprising:

a managing means for determining whether a communication path is usable or not between processors, and determining any one of usable communication paths to be an active communication path;

a switching means for switching between the active communication path and the stand-by communication path, whereby setting any communication bus to the active communication path for each target processor, and transmitting/receiving data on the active communication path while setting another communication bus as a stand-by communication path;

a reception means for writing the new program file to the main storage of each stand-by CPU;

a start means for starting the new program file which is written into the main storage of the standby CPU;

an active means for setting the new program file, which is started by the stand-by CPU, to the active new program file;

means for starting the new program file, which is read in the main storage of the stand-by CPU, from the active CPU, during operation of the active CPU using the old program file;

means for communicating between stand-by CPUs by using the stand-by communication path which is set by the active CPU in order to confirm operation of the new program file in the stand-by CPU; and means for setting all stand-by CPUs to the active CPUs so that the program file is updated from the old program file to the new program file.

15. A multiprocessor system as claimed in claim 13, further comprising a designating means for designating a target processor to transfer the new program file by storing information for the target processor to be transferred on the main storage of the particular processor, thereby said particular processor switching the program file of only the designated processor in accordance with the stored information.

16. A multiprocessor system as claimed in claim 14, further comprising a designating means for designating a target processor to transfer the new program file by storing information for the target processor to be transferred on the main storage of the particular processor, thereby said particular processor switching the program file of only the designated processor in accordance with the stored information.

17. A multiprocessor system as claimed in claim 13, further comprising a designating means for designating a program file to be transferred and for storing an objected program file to be transferred within the new program file on the main storage of the particular processor, thereby copying the old program file in the main storage of the stand-by CPU of each processor, and switching only objected program file to be transferred to the new program file.

18. A multiprocessor system as claimed in claim 14, further comprising a designating means for designating a program file to be transferred and for storing an objected program file to be transferred within the new program file on the main storage of the particular processor, thereby copying the old program file on the main storage of the stand-by CPU of each processor, and switching only objected program file to be transferred to the new program file.

19. A multiprocessor system as claimed in claim 13, further comprising a new program file transfer means for transferring the new program file to be transferred to the target processor, thereby starting the transfer of the new program file for each target processor in order to transfer the new program file.

20. A multiprocessor system as claimed in claim 14, further comprising a new program file transfer means for transferring the new program file to be transferred to the target processor, thereby starting the transfer of the new program file for each target processor in order to transfer the new program file.

21. A multiprocessor system as claimed in claim 13, further comprising an automatic transfer means for an input command for automatically transferring the input command from the old program file side to the new program file side, thereby during operation of the active CPU by the old program file, inputting a particular command, which is input to the old program file side, to the new program file side in order to start input command.

22. A multiprocessor system as claimed in claim 14, further comprising an automatic transfer means for an input command for automatically transferring the input command from the old program file side to the new program file side, thereby during operation of the active CPU by the old program file, inputting a particular command, which is input to the old program file side, to the new program file side in order to start input command.

23. A multiprocessor system as claimed in claim 13, further comprising a data following/converting means for following data of the old program file side to the new program file side based on the input command, and for converting the data followed by the above into data of the new program file side; thereby during operation of the old program file by the active CPU, transferring the followed data of the old program file side to the new program file, in the new program file side, converting the followed data to the data used for the new program file side, and following the new program file.

24. A multiprocessor system as claimed in claim 14, further comprising a data following/converting means for following data of the old program file side to the new program file side based on the input command, and for converting the data followed by the above into data of the new program file side; thereby during operation of the old program file by the active CPU, transferring the followed data of the old program file side to the new program file, in the new program file side, converting the followed data to the data used for the new program file side, and following the new program file.

* * * * *